United States Patent [19]

Dobashi et al.

[11] Patent Number: 5,687,333
[45] Date of Patent: Nov. 11, 1997

[54] INFORMATION SERVICE SYSTEM RESPONSIVE TO USER'S POINTING MANIPULATION

[75] Inventors: Hironori Dobashi; Seiichi Hashiya, both of Yokohama, Japan

[73] Assignee: Kabushiki Kaisha Toshiba, Kawasaki, Japan

[21] Appl. No.: 413,761

[22] Filed: Mar. 30, 1995

[30] Foreign Application Priority Data

Mar. 31, 1994 [JP] Japan ................... 6-063755

[51] Int. Cl.⁶ ............................................. G06F 3/00
[52] U.S. Cl. ..................... 395/336; 395/340; 395/357
[58] Field of Search ................................. 395/336, 326, 395/329, 330, 334, 335, 339, 340, 357

[56] References Cited

U.S. PATENT DOCUMENTS

| | | | |
|---|---|---|---|
| 5,422,993 | 6/1995 | Fleming | 395/326 |
| 5,438,661 | 8/1995 | Ogawa | 395/328 |
| 5,491,795 | 2/1996 | Beaudet et al. | 395/329 |
| 5,555,364 | 9/1996 | Goldstein | 395/327 |
| 5,557,729 | 9/1996 | Frean | 395/327 |

OTHER PUBLICATIONS

"Novell Netwave Multimedia Communication System Using Microso," *System Theory*, 1995 Southeastern Symposium, IEEE.

*LearnLinc* V-1-52, ILI Corp., Troy, NY 1994.

*Primary Examiner*—Raymond J. Bayerl
*Assistant Examiner*—Steven P. Sax
*Attorney, Agent, or Firm*—Cushman Darby & Cushman IP Group of Pillsbury Madison & Sutro LLP

[57] ABSTRACT

A predetermined position on a paper sheet is pointed by a finger, and a first image of the paper sheet picked up by an image pickup device before pointing by the finger is stored. A second image of the paper sheet picked up by the image pickup device upon pointing by the finger is stored. By subtracting the first image from the second image, the pointed position on the paper sheet by the finger is detected. The meaning or content data of a term at the detected position is read out from a database, and is displayed.

18 Claims, 19 Drawing Sheets

FROM LEFT SIDE

FROM RIGHT SIDE

FROM UPPER SIDE

FROM LOWER SIDE

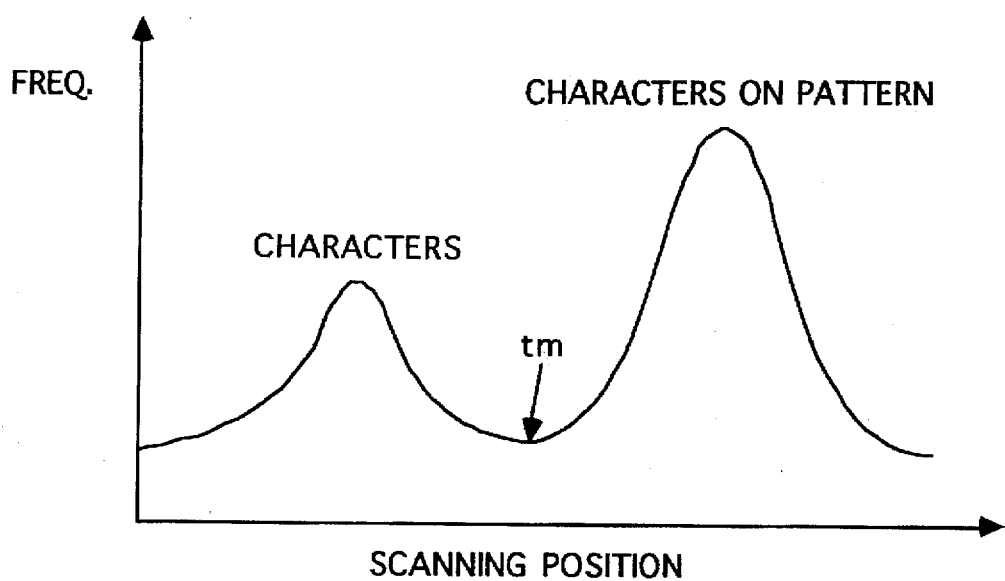
FIG. 14
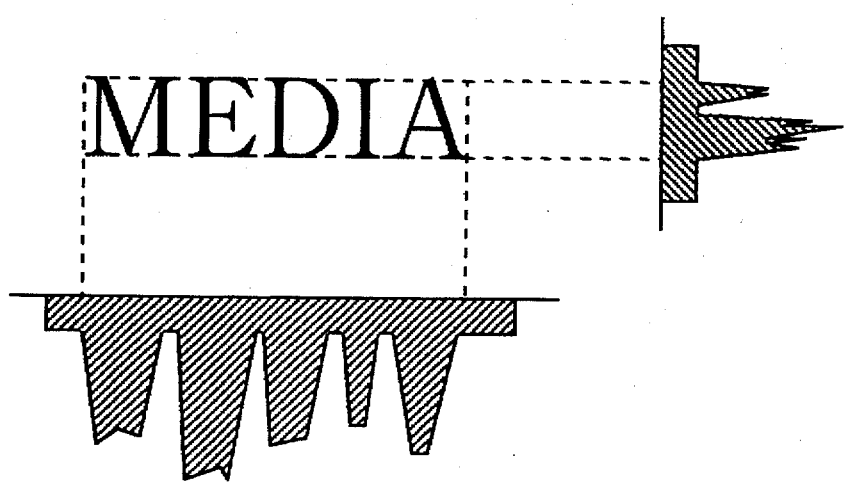
FIG. 15
M E D I A
FIG. 16

PICKED UP ITEM/TERM

ITEM/TERM SEARCH SEQUENCE.

ary system or information service system having an improved user interface, for displaying, on a display, the detailed explanation of a term (or item) whose meaning is unknown when a user or operator points the term with his or her finger.

INFORMATION SERVICE SYSTEM RESPONSIVE TO USER'S POINTING MANIPULATION

BACKGROUND OF THE INVENTION

1. Field of the Invention

The present invention relates to an electronic dictionary system or information service system having an improved user interface, for displaying, on a display, the detailed explanation of a term (or item) whose meaning is unknown when a user or operator points the term with his or her finger.

2. Description of the Related Art

Systems are known for displaying a detailed explanation of a term whose meaning is unknown on a display device such as a CRT display when a user points the term with his or her finger. Also, systems are known that use a finger or a light pen on a touch panel, and that use a mouse cursor on a display device, or the like. In such a system, pointable terms are classified in units of fields.

Upon pointing on the touch panel or on the display device using a mouse cursor, it is very difficult for heavily handicapped persons who, for example, cannot freely move their hands to point a term with a light pen or to operate the mouse.

Thus, there is a need for a system which allows a simple, easy pointing input manipulation as to a term whose meaning is to be found, and can easily output the detailed explanation of the term without manually looking up a dictionary.

SUMMARY OF THE INVENTION

It is accordingly an object of the present invention to provide an information service system which allows a simple, easy pointing input, and can easily and quickly display or output the detailed explanation of a term by computer processing by means of a visual or aural method.

In order to achieve the above object, a system of the present invention comprises: pointing means for pointing a predetermined position on a medium, which holds a specific term or item; first memory means for storing an image of the entire medium; second memory means for storing an image obtained by picking up an image of the medium upon pointing by the pointing means; and detection means for detecting the pointed position on the medium by the pointing means on the basis of the image stored in the first memory means and the picked-up image stored in the second memory means.

In the system of the present invention, when the specific term or item is located at the pointed position on the medium detected by the detection means, the contents of the specific term (characters or pattern) are interpreted. An electronic dictionary (or database) is searched using the interpreted contents as a search key, and the explanation or the like of the specific term is displayed/output by means of characters, picture, and/or sound.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 14 is a graph showing an example of the density histogram of a term;

FIG. 15 explains a term extraction method;

FIG. 16 is view showing a term extraction result;

DETAILED DESCRIPTION OF THE PREFERRED EMBODIMENTS

An embodiment of the present invention will be described hereinafter with reference to the accompanying drawings.

Figure 1:
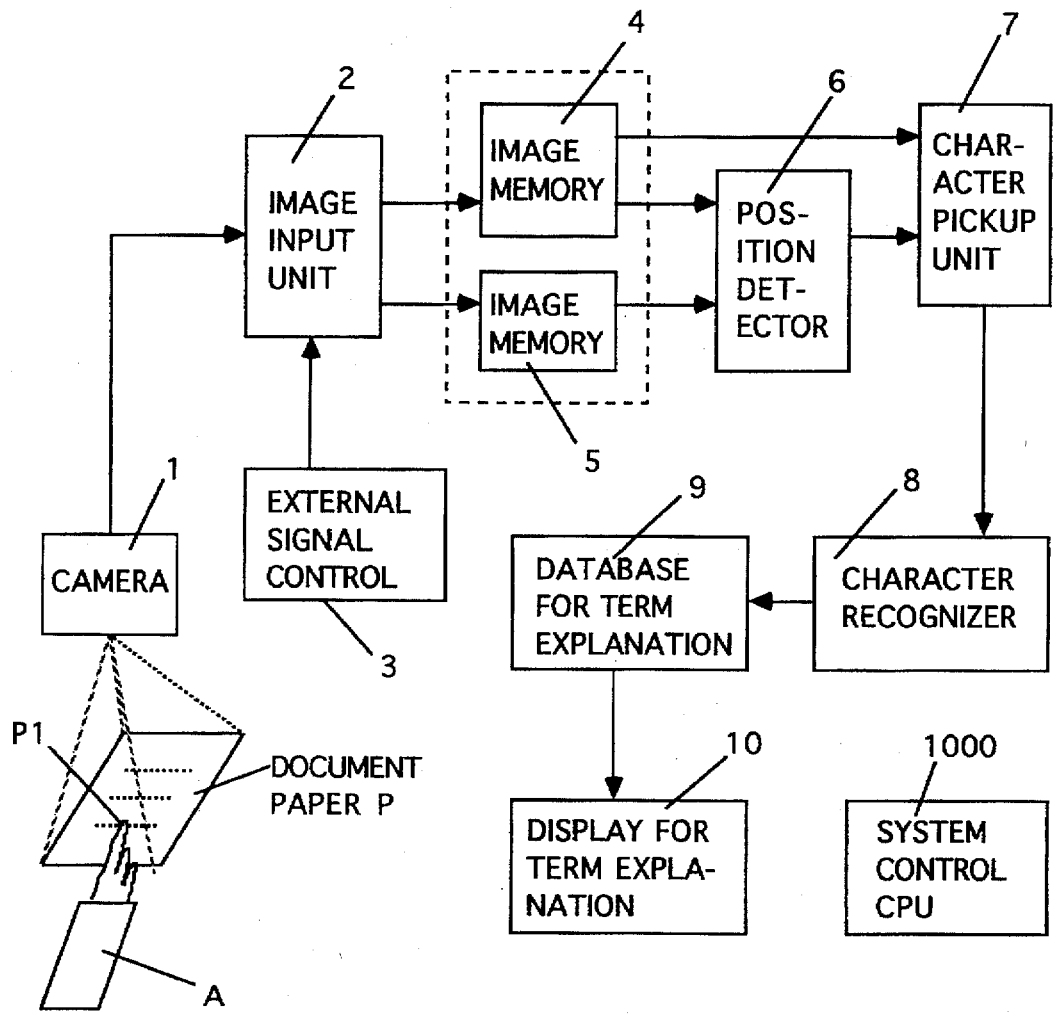
FIG. 1 is a schematic block diagram showing the arrangement of an information service system (hypermedia system) according to the first embodiment of the present invention.

FIG. 1 is a schematic block diagram showing the arrangement of an information service system (hypermedia system) according to the present invention.

The hypermedia system comprises image pickup device 1 such as a video camera (e.g., CCD image sensor) for picking up an image of paper sheet P which is a medium to be imaged, image input unit 2 for converting the image of paper sheet P picked up by image pickup device 1 into image data, external signal controller 3 for supplying a command to image input unit 2 and image pickup device 1 so as to fetch the image data, image data memory 4 for storing the image data (paper sheet image data; first stored image) of paper sheet P picked up by image pickup device 1, image data memory 5 for storing image data (pointed image data; second stored image) of paper sheet P picked up by image pickup device 1 in a state wherein a user points a specific position on paper sheet P with his or her finger A, position detector 6 for detecting the position of image data near term P1 in paper sheet P by extracting only an image of finger A on the image data using the paper sheet image data and the pointed image data respectively stored in image data memories 4 and 5, and for detecting the position (coordinate value) of the tip of finger A from the extracted image, character pick up unit 7 for extracting or picking up target term P1 character by character from the image at the position detected by position detector 6, character recognition unit 8 for recognizing each of the characters extracted or picked up by character pick up unit 7 using a multiple similarity method, term explanation memory (electronic dictionary or database) 9 for storing term explanations corresponding to terms recognized by character recognition unit 8, and term explanation display unit 10 which comprises a display device such as a CRT display for displaying a term explanation read out from term explanation memory 9, and displays the detailed explanation of a term whose explanation is required.

External signal controller 3 handles a control button (switch) or a conventional speech recognition system, and is manipulated by a user.

The operations from a term pointing manipulation to a term explanation display operation in the above-mentioned arrangement will be described below with reference to the flow charts shown in FIGS. 2 and 4 which are executed by CPU 1000. Note that the processing shown in FIG. 4 is executed parallel to that shown in FIG. 2.

Figure 2:
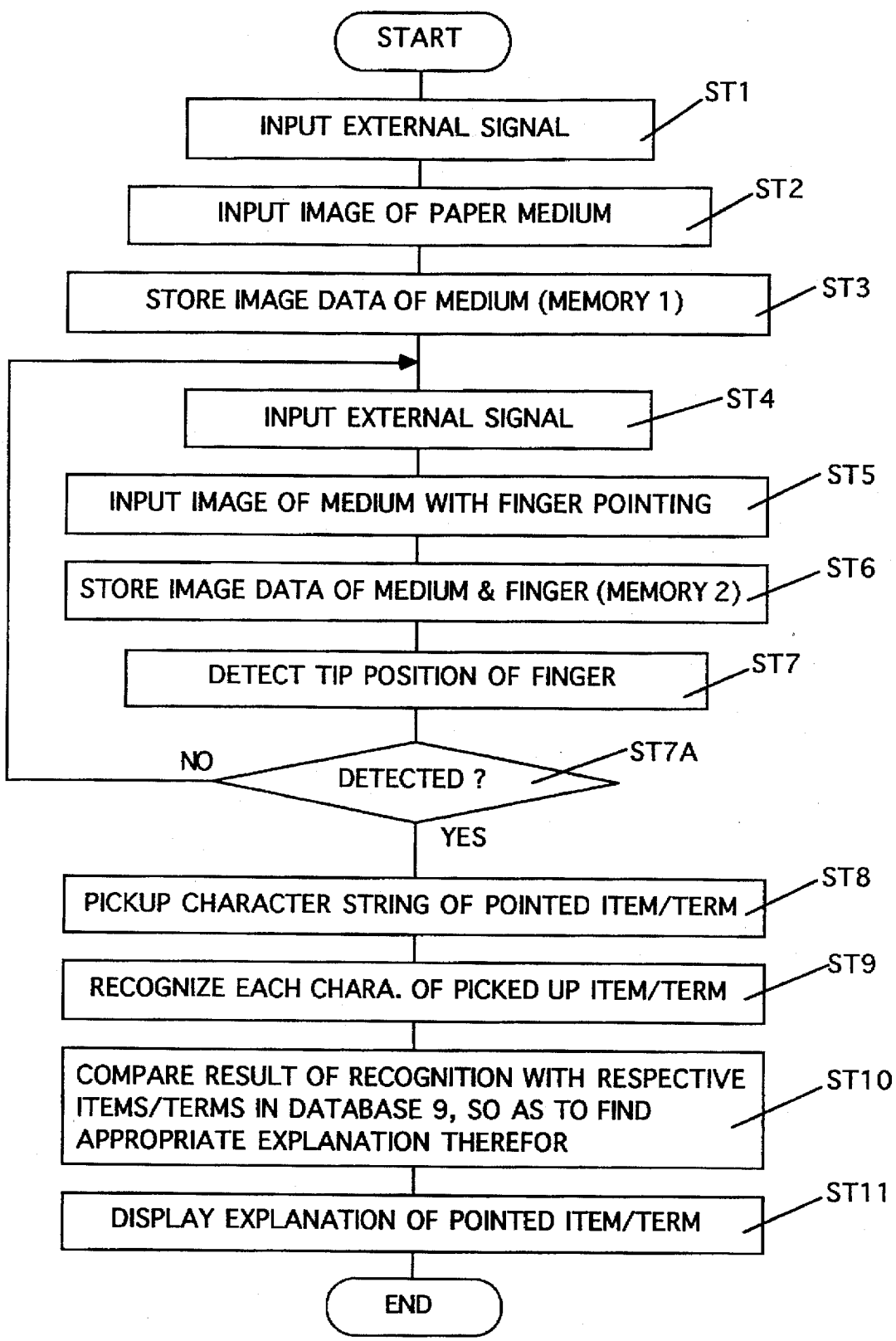
FIG. 2 is a flow chart for explaining the operations from a term pointing manipulation to term explanation display operation.
Figure 4:
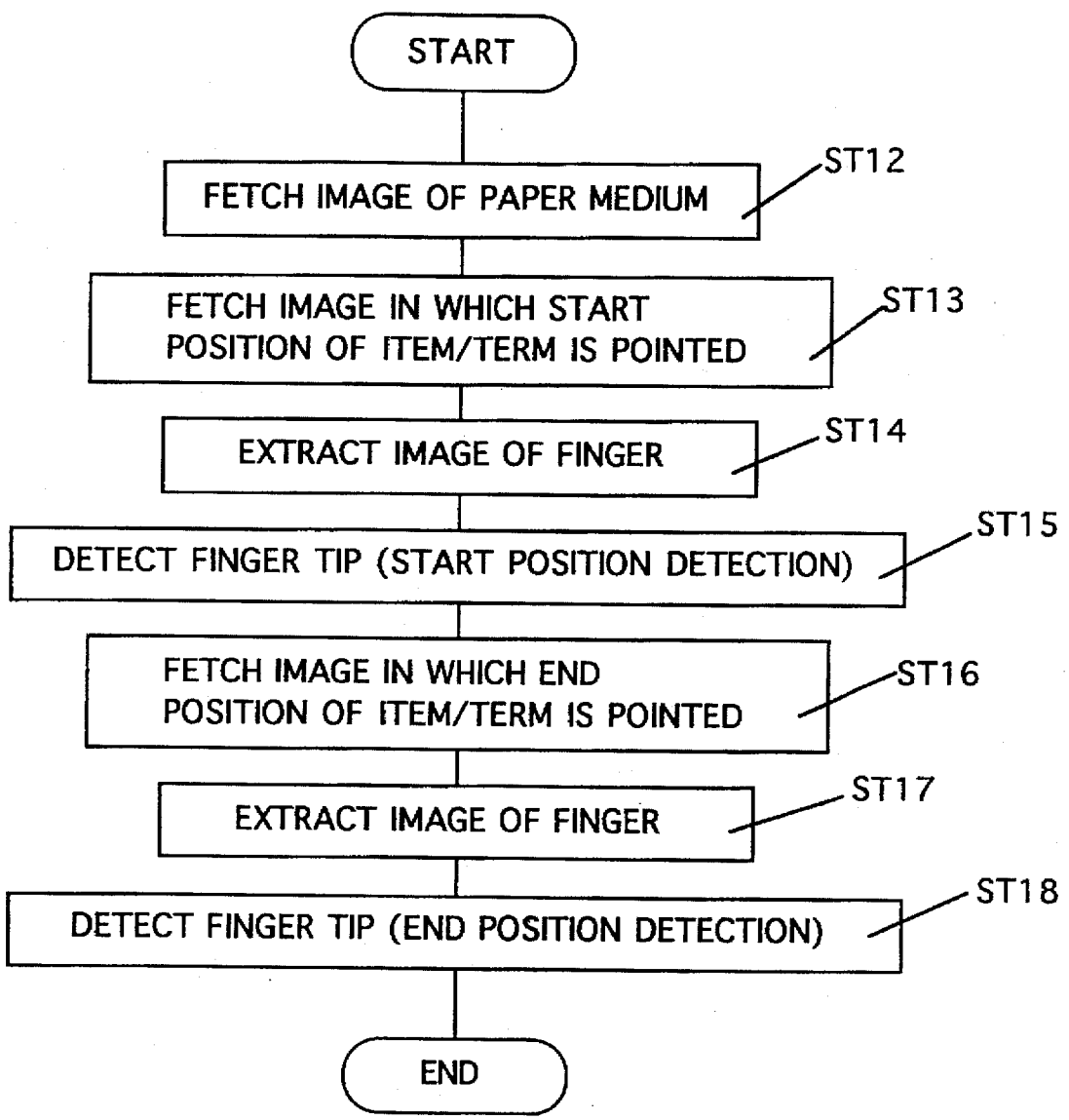
FIG. 4 is a flow chart for explaining the operation for detecting the positions of the start and end points of a term pointed by a finger.

More specifically, when image data of paper sheet P is input, a command is supplied to image input unit 2 and image pickup device 1 by controlling external controller 3, thereby fetching image data (step ST1 in FIG. 2, step ST12 in FIG. 4). The fetched paper sheet image data (step ST2) is stored in image data memory 4 with a size of M×N pixels (step ST3). Thereafter, by controlling external signal controller 3 (step ST4), an image in a state wherein a position near the upper left portion of the first character of term P1 in paper sheet P is pointed with finger A of a user is input from image pickup device 1 and image input unit 2 (step ST5), and the input image is stored in image data memory 5 as pointed image data (step ST6 in FIG. 2, step ST13 in FIG. 4).

Position detector 6 extracts only an image of finger A on the image data in the above-mentioned size of, e.g., M×N pixels using the paper sheet image data and the pointed image data respectively stored in image data memories 4 and 5 (step ST14 in FIG. 4), detects the position (coordinate value) of the tip of finger A from the extracted image (step ST7 and NO in step ST7A in FIG. 2, step ST15 in FIG. 4), and stores the detected position in its internal memory.

Then, the memory contents of image data memory 5 are cleared, and an image in a state wherein a position near the lower right portion of the last character in term P1 in paper sheet P is pointed by finger A of a user is similarly input from image pickup device 1 and image input unit 2 by controlling external signal controller 3 (step ST4, step ST5). The input image is stored in image data memory 5 as new pointed image data (step ST6, step ST16).

Furthermore, position detector 6 extracts only an image of finger A on the image data in the above-mentioned size of, e.g., M×N pixels using the paper sheet image data and the pointed image data respectively stored in image data memories 4 and 5 (step ST17), detects the position (coordinate value) of the tip of finger A from the extracted image (step ST7, NO in step ST7A, step ST18), and stores the detected position in its another internal memory.

When the positions (coordinate values) of the tip of finger A near the first and last characters in term P1 in paper sheet P are detected, image data corresponding to the detected positions near term P1 in paper sheet P is extracted from the paper sheet image data stored in image data memory 4.

After the end of detection of the tip positions of finger A (YES in step ST7A), target term P1 is extracted from the image by character pick up unit 7 (step ST8), characters of extracted term P1 are extracted, and each of the extracted characters is recognized by character recognition unit 8 using the multiple similarity method (step ST9).

The first character in term P1 is compared with those of terms stored in a term section of term explanation memory 9 to extract terms whose first characters coincide with that of term P1. Then, the second character in term P1 is compared with those of the extracted terms to extract terms whose second characters coincide with that of term P1. In this manner, a term whose all characters coincide with those of term P1 is extracted from the term section of term explanation memory 9 (step ST10).

The explanation of the extracted term is displayed on term explanation display unit 10 (step ST11). When no term is extracted from term explanation memory 9, a message indicating this ("no corresponding term is registered" or the like) is displayed on term explanation display unit 10.

Note that paper sheet P is placed not to be inclined with respect to image pickup device 1. Paper sheet P may be every type of paper sheet such as newspapers, magazines, teaching materials, and the like, and terms and the like (including not only characters but also pictures and patterns) printed on the paper sheet may be terms and the like used in every field. More specifically, the terms and their explanations stored in term explanation memory 9 are those used in every field.

The image data of paper sheet P is not limited to a density image (monochrome gray-scale image) but may be a color image.

Furthermore, paper sheet image data may be stored in advance in image data memory 4, and thereafter, image data in a state wherein a position near the upper left portion of the first character in term P1 in paper sheet P is pointed by finger A, or image data in a state wherein a position near the lower right portion of the last character in term P1 in paper sheet P is pointed by finger A may be stored in image data memory 5. Upon extraction of image data of term P1 from image data memory 4, even when term P1 in paper sheet P is concealed under finger A by pointing image data of term P1 in paper sheet P, since two image data are separately stored in image data memories 4 and 5, entire term P1 can be recognized.

The input method (step ST2 in FIG. 2) and the storage method (step ST3, step ST6 in FIG. 2) of image data will be described below. Paper sheet image data is read by image pickup device 1 and image input unit 2 in response to a signal supplied from external signal controller 3 by a user's manipulation, and is stored as paper sheet image data in image data memory 4 in a predetermined size, e.g., M×N pixels.

Thereafter, a position near the upper left portion of the start character in term P1 in paper sheet P is pointed by finger A, and paper sheet image data in the state pointed by finger A (finger A stands still) is read by image pickup device 1 and image input unit 2 in response to a signal supplied from external signal controller 3. The read image data is stored in image data memory 5 as pointed image data of term P1 in paper sheet P in the same size, i.e., M×N pixels.

Figure 3:
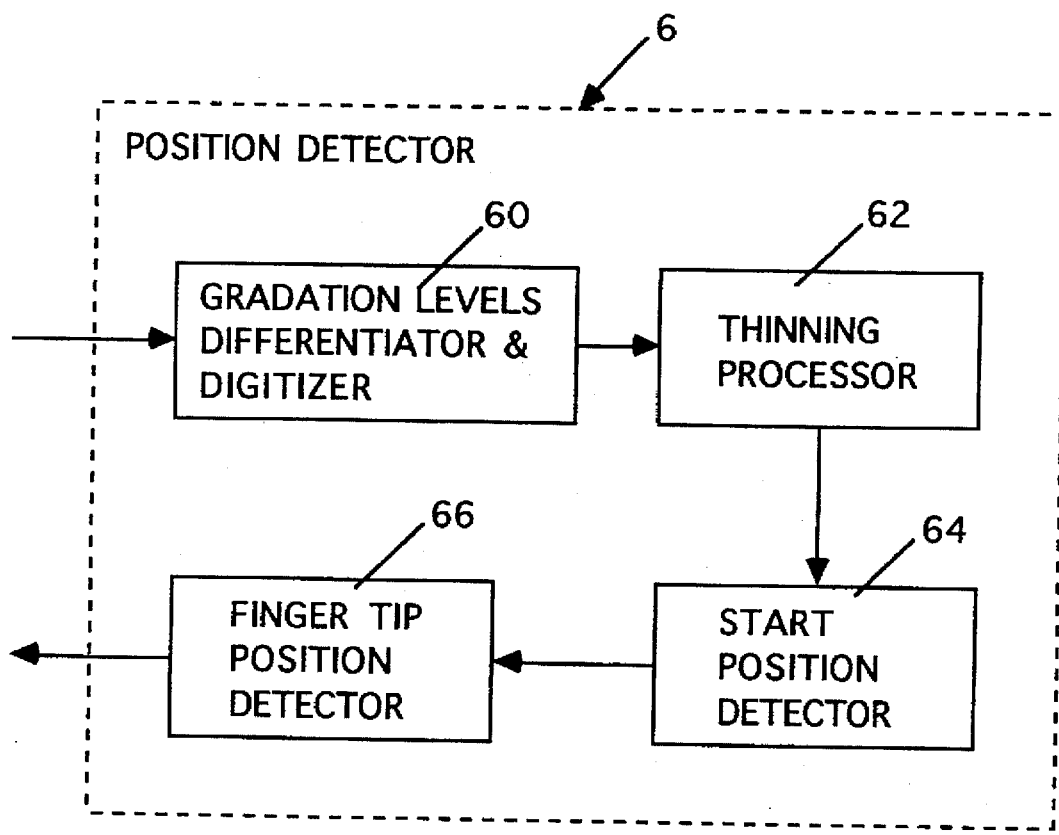
FIG. 3 is a block diagram for explaining the processing in the position detector (6) in FIG. 1.

Position detector 6 will be described below. Position detector 6 has the arrangement shown in FIG. 3. Position detector 6 detects the position on image data of term P1 in paper sheet P, and the detection method will be described below. First, an image of only finger A is extracted using the paper sheet image data stored in image data memory 4, and the pointed image data of term P1 in paper sheet P in the first state pointed by finger A and stored in image data memory 5.

For example, if the size of image data is defined by M×N pixels, the density value of each pixel of the paper sheet image data is represented by $F_{i,j}$ ($0 \leq i < M$, $0 \leq j < N$), and the density value of each pixel of the pointed image data near the first character of term P1 in paper P is represented by $G_{i,j}$ ($0 \leq i < M$, $0 \leq j < N$). Then, contrast $D_{i,j}$ of the first character of term P1 is given by:

$$D_{i,j} = G_{i,j} - F_{i,j} \geq K \quad (1)$$

Figure 5:
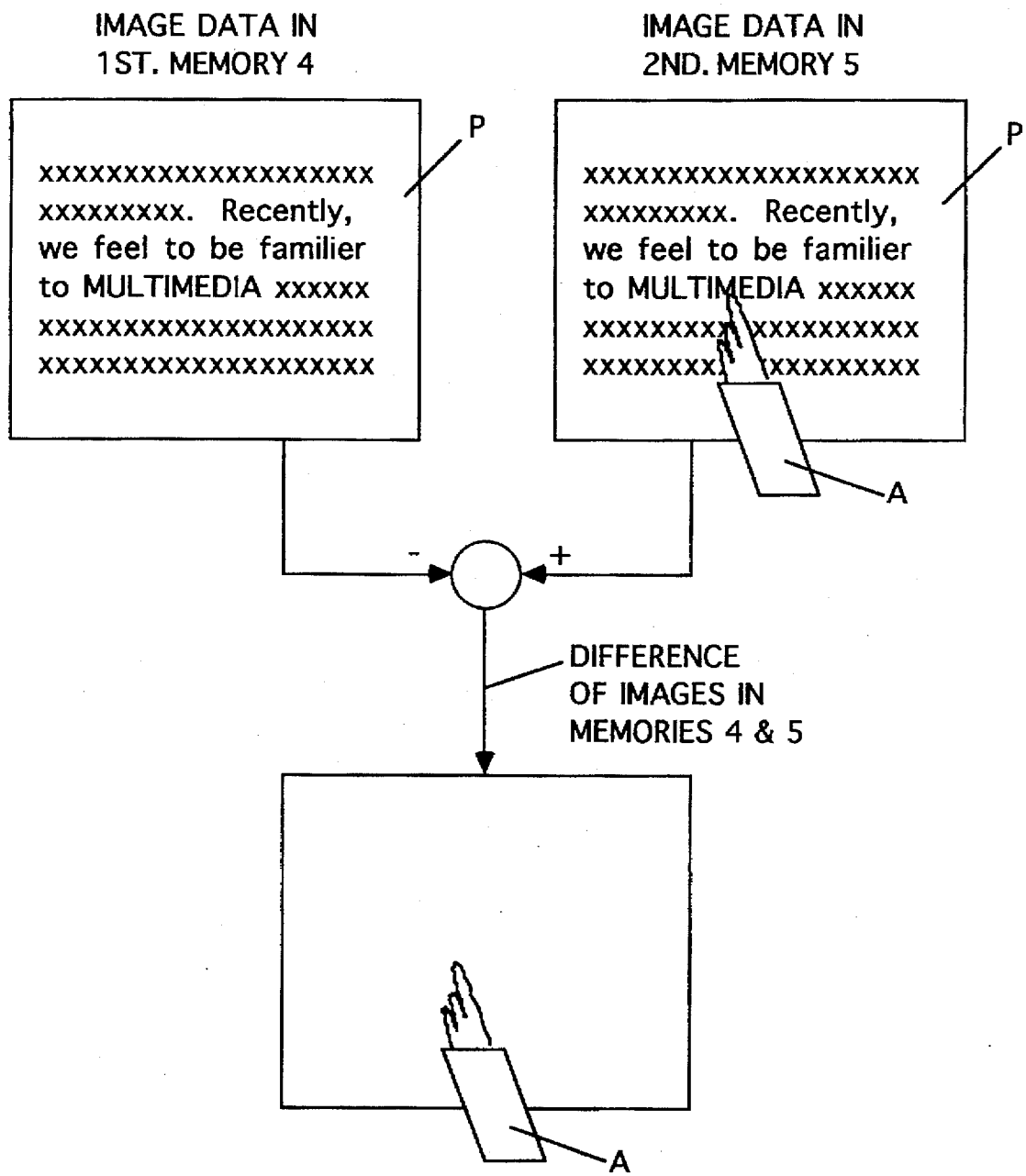
FIG. 5 is a view illustrating an example of extraction of a finger image.

When $D_{i,j}$ is equal to or larger than predetermined value K, $F_{i,j}=1$; otherwise ($D_{i,j}<K$), $F_{i,j}=0$, thereby extracting only the image of finger A (FIG. 5).

Figure 6A:
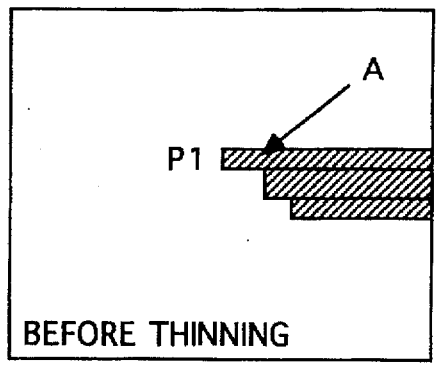
FIGS. 6A and 6B are views illustrating thinning processing of a finger image.
Figure 6B:
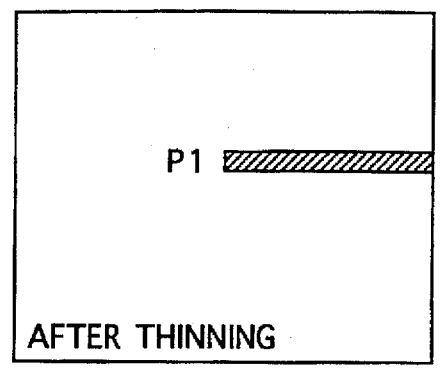

Thereafter, the image of only finger A obtained by the above-mentioned method is subjected to thinning processing (FIGS. 6A and 6B) so as not to lose continuity. The thinning processing is disclosed in the following documents:

(1) E. S. Deutsch: "Comments on a line thinning scheme", Comput. J., vol. 12, 1969, p. 412.

(2) E. S. Deutsch: "Thinning algorithms on rectangular, hexagonal and triangular arrays", C. ACM. vol. 15, no. 9, 1972, pp. 827 to 837.

(3) C. J. Hildith: "Linear skeletons from square cupboads", in Machine Intelligence IV, B. Meltzer and D. Michie, Eds., University Press, Edinburgh, 1969, pp. 403 to 420.

(4) S. Yokoi, J. Toriwaki and T. Fukumura: "On generalized distance transformation of digitized pictures", IEEE Tranc. Pattern Anal. Machine Intel., vol. PAMI-3, no. 4, 1981, pp. 424 to 443.

Then, the position of the tip of finger A is detected (step ST7 in FIG. 2). This detection method will be described below.

The thinned image of finger A obtained by the above-mentioned method is present from one of the four sides on image data to the center of the image, as exemplified in FIGS. 7A to 7D. For this reason, by tracing the thinned image of finger A from one of the four sides where the image is present toward the center, the tip position (coordinate value) of finger A can be detected.

The method of detecting one of the four sides and the method of detecting the tip position when the image is present extending from the left side of the image toward the center, as shown in, e.g., FIG. 7A, will be described below.

Assume that the size of image data is defined by M×N pixels, and the density value of each pixel is represented by $F_{i,j}$ ($0 \leq i < M$, $0 \leq j < N$, $F_{i,j}$="1" or "0"). As indicated by (1) in FIG. 8, only one data array is searched from the upper left corner of the image in each of the rightward and downward directions to detect the position (to be referred to as a start position hereinafter), where density value $F_{i,j}$ used in equation (1) becomes "1", of one of the upper and left sides.

Figure 8:
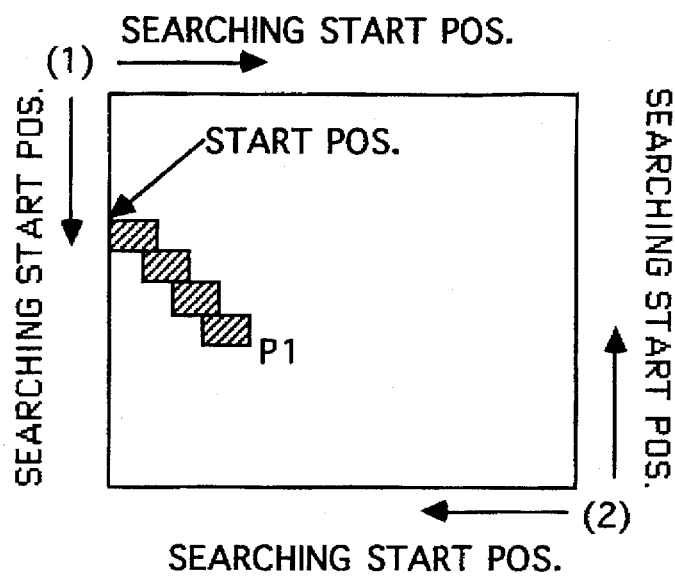
FIG. 8 is a view for explaining a method of detecting at least one of the four sides of the finger image frame after the thinning processing.

If the start position is not detected, as indicated (2) in FIG. 8, only one data array is searched from the lower right corner in each of the leftward and upward directions to detect the start position.

Note that "only one data array is searched" means changing values i and j of $F_{i,j}$ within a range of $0 \leq i < M$ while setting j=0, for example, when the image is searched from the upper left corner in the rightward direction.

Figure 7:
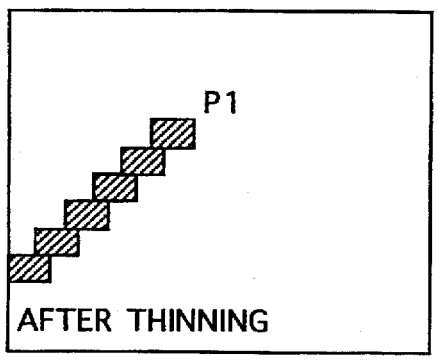
FIGS. 7A to 7D are views illustrating examples of finger images after the thinning processing.
Figure 7:
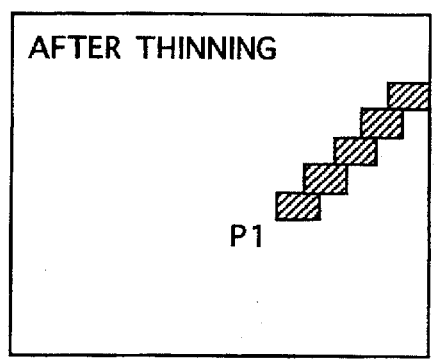
Figure 7:
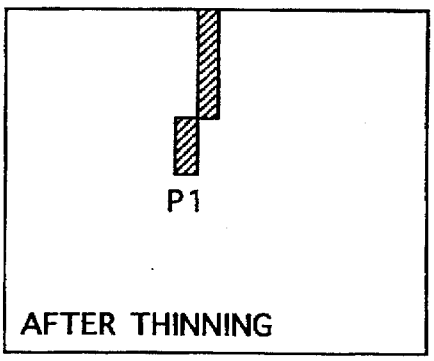
Figure 7:
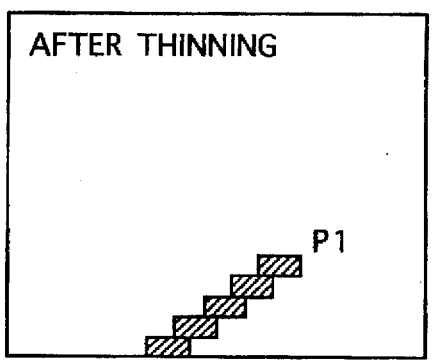
Figure 10:
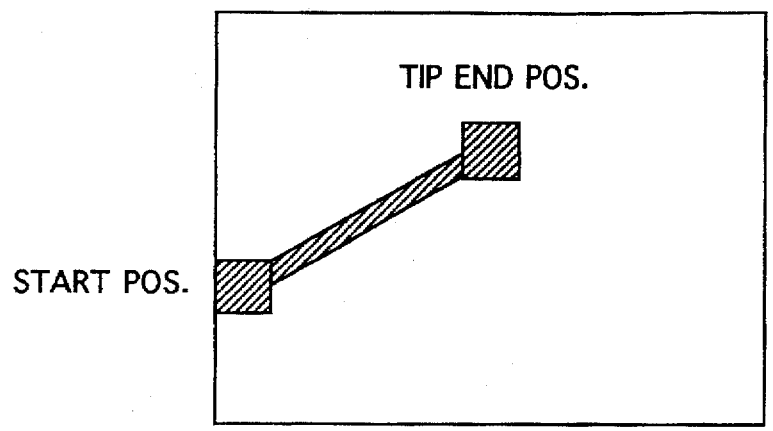
FIG. 10 is a view illustrating an example of the finger tip position.

For example, in the case of FIG. 7A and FIG. 10, the start position is located on the left side, and the tip position is searched from the start position toward the center.

Assuming that the pixel of interest is pixel $F_{i,j}$, the tip position of finger A is searched counterclockwise from pixel $F_{i,j+1}$ using eight pixel values around pixel $F_{i,j}$. Each time a pixel of F=1 is detected, the value of the detected pixel is set to be F=2. In the subsequent searching, values i and j at a position where no more pixel of F=1 is present in the eight pixels around pixel $F_{i,j}$ of interest, i.e., a position obtained when F=1 is no longer detected, are calculated as the tip position of finger A, and are stored in the internal memory of position detector 6.

The tip position of finger A is searched counterclockwise from pixel $F_{i,j-1}$ in the case of FIG. 7B; from pixel $F_{i-1,j}$ in the case of FIG. 7C; and from pixel $F_{i+1,j}$ in the case of FIG. 7D.

Thereafter, the memory contents of image data memory 5 are cleared, and image data of paper sheet P in the next state pointed by finger A (in a state wherein a position near the lower right portion of the last character in term P1 in paper sheet P is pointed by finger A, and finger A stands still) is read by image pickup device 1 and image input unit 2 in response to a user's manipulation signal supplied from external signal controller 3. The read image data is stored in image data memory 5 as new pointed image data of term P1.

Figure 9:
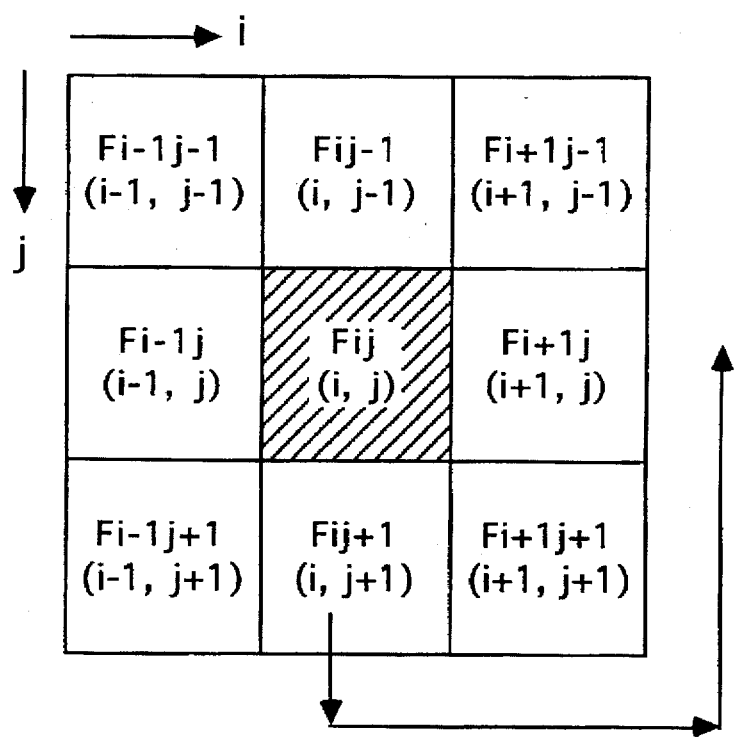
FIG. 9 is a view showing eight surrounding pixels upon detection of a position $(F_{i,j})$ of the finger tip.

As in the above description, differences between the density values of pixels of the image data of paper sheet P and the new pointed image data (near the end of term P1) in paper sheet P are calculated, and these differences are binarized to extract an edge image of finger A, thus achieving the thinning processing. By the method described above with reference to FIG. 9, the position (the tip position of finger A in the next pointed state) near the lower right portion of the last character in term P1 in paper sheet P is detected, and values i and j of the detected position are stored in another internal memory of position detector 6.

The processing method of image data will be described below with reference to FIGS. 10 to 18.

Figure 11A:
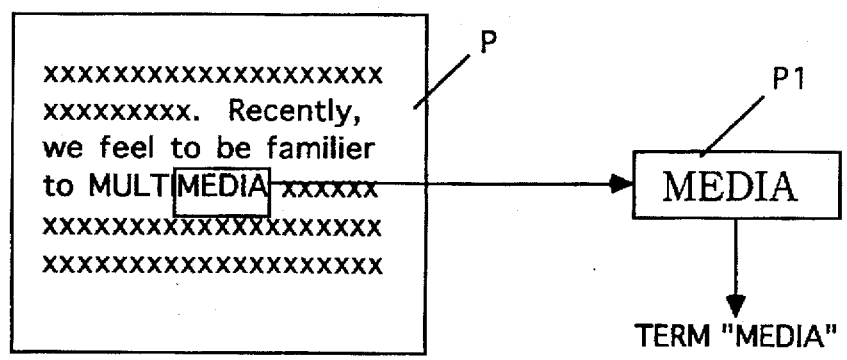
FIG. 11A is a view illustrating an example of term extraction.
Figure 12:
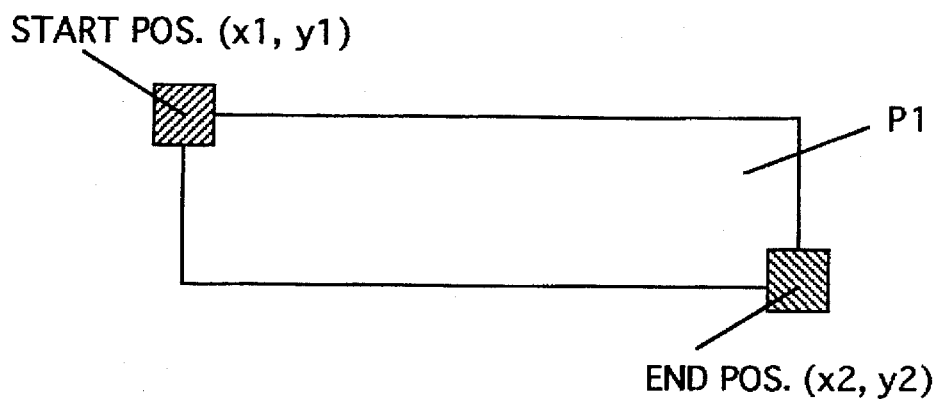
FIG. 12 illustrates an example of a determined term extraction range.
Figure 13:
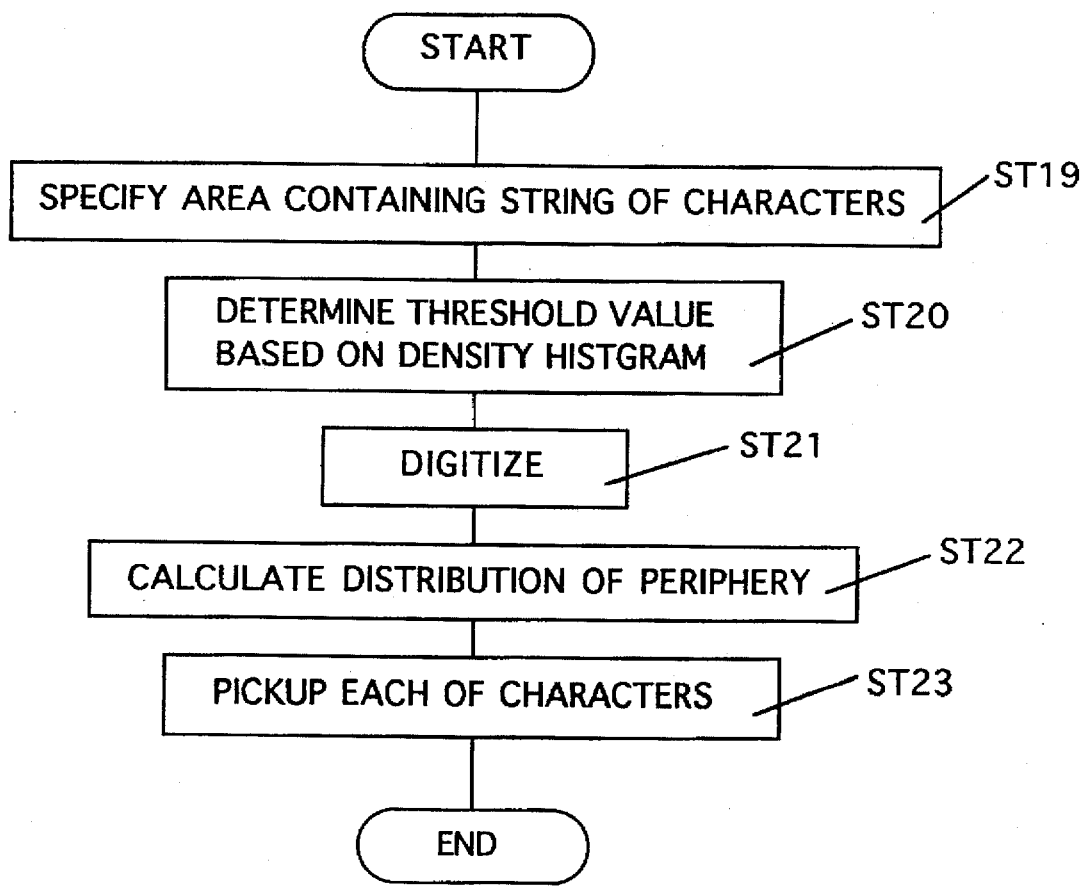
FIG. 13 is a flow chart for explaining the term extraction operation.

An image data extraction range of term P1 is determined (step ST19 in FIG. 13) on the basis of the extracted position (start point (i1, j1)) of the upper left portion of the first character in term P1 in paper sheet P pointed by finger A, and the extracted position (end point (i2, j2)) of the lower right portion of the last character, as shown in FIG. 12. Based on the determined range, image data near term P1 in paper sheet P is extracted from the image data of paper sheet P stored in image data memory 4 (FIG. 11A). Then, term P1 in paper sheet P is extracted by character pick up unit 7, and each of characters in term P1 in paper sheet P is recognized by character recognition unit 8.

In character pick up unit 7, when a term in a paper sheet printed on a complicated background such as a pattern is to be extracted, the density histogram of a density image normally includes two peaks indicating a character region and a pattern region, as shown in FIG. 14. By analyzing the density histogram, density value tm which assumes a minimal value of the histogram between two peaks (maximal values) is calculated (step ST20 in FIG. 13), and threshold processing of the density image is executed based on density value tm, thereby extracting term P1 in paper sheet P as a binary image (step ST21).

Extracted pixels of the extracted binary image data are accumulated in the vertical and horizontal directions to obtain peripheral distributions, as indicated by hatched portions in FIG. 15 (step ST22). For example, from the peripheral distribution obtained by accumulating the pixels in the horizontal direction, the range of a "non-zero" distribution (i.e., a range in which at least one pixel associated with a character image is present) is defined as the vertical direction of the character region. Similarly, for example, from the distribution obtained by accumulating the pixels in the vertical direction, the range of a plurality of "non-zero" distributions is defined as the horizontal direction of each character, thereby detecting each character region, as shown in FIG. 16.

In this manner, character extraction, i.e., extraction of term P1 in paper sheet P is achieved (step ST23), and each of the extracted characters is recognized by character recognition unit 8 using the multiple similarity method.

Figure 17:
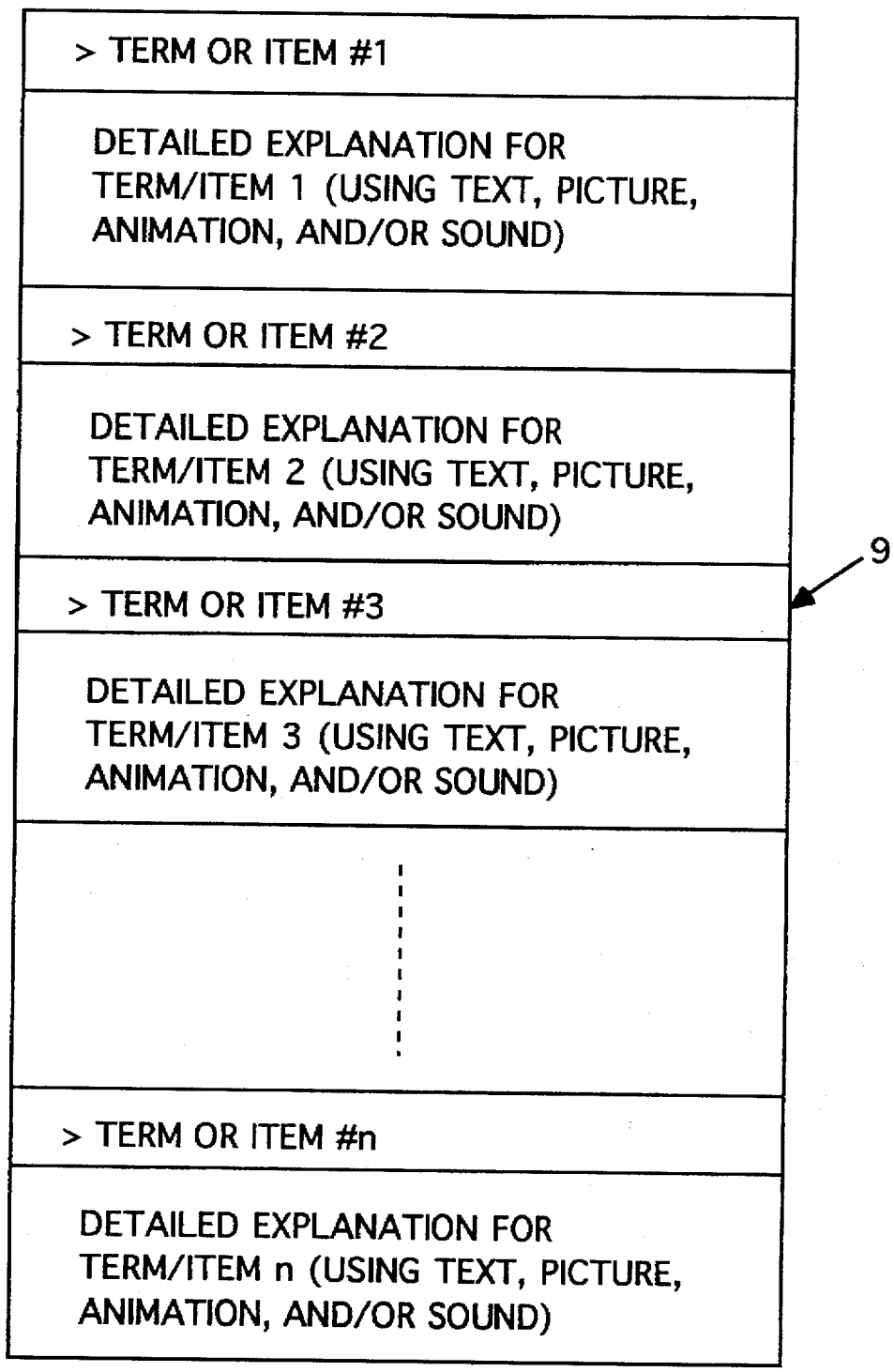
FIG. 17 shows an example of the memory format of a term explanation memory (9) shown in FIG. 1.

The storage method of term explanations will be described below. As shown in FIG. 17, various terms and their detailed explanations (meanings, contents, and the like) are stored in term explanation memory 9 in the order of kana syllables, Kanji syllables, and/or kana-kanji syllables (for Japanese terms) or in the alphabetical order (for English terms). Data such as pictures, patterns, sounds (digital sampling data), and the like can also be stored in memory 9 by assigning proper classification codes thereto.

The comparison/reference method between term P1 in paper sheet P pointed by finger A, and terms stored in term explanation memory 9 will be described below. Term P1 in paper sheet P extracted by the above-mentioned method (step ST8 in FIG. 2) is subjected to character recognition (step ST9) in turn from the first character, and thereafter, the recognized first character of term P1 is compared with the first characters of the respective terms in the term section of term explanation memory 9 (step ST10). This processing is performed in units of characters until coincidences of all the characters are found.

Figure 18A:
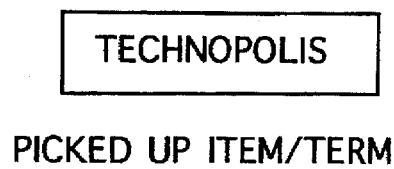
FIGS. 18A and 18B are views for explaining a method for comparing/referring a term pointed by a user with/to terms in a term explanation memory.
Figure 18B:
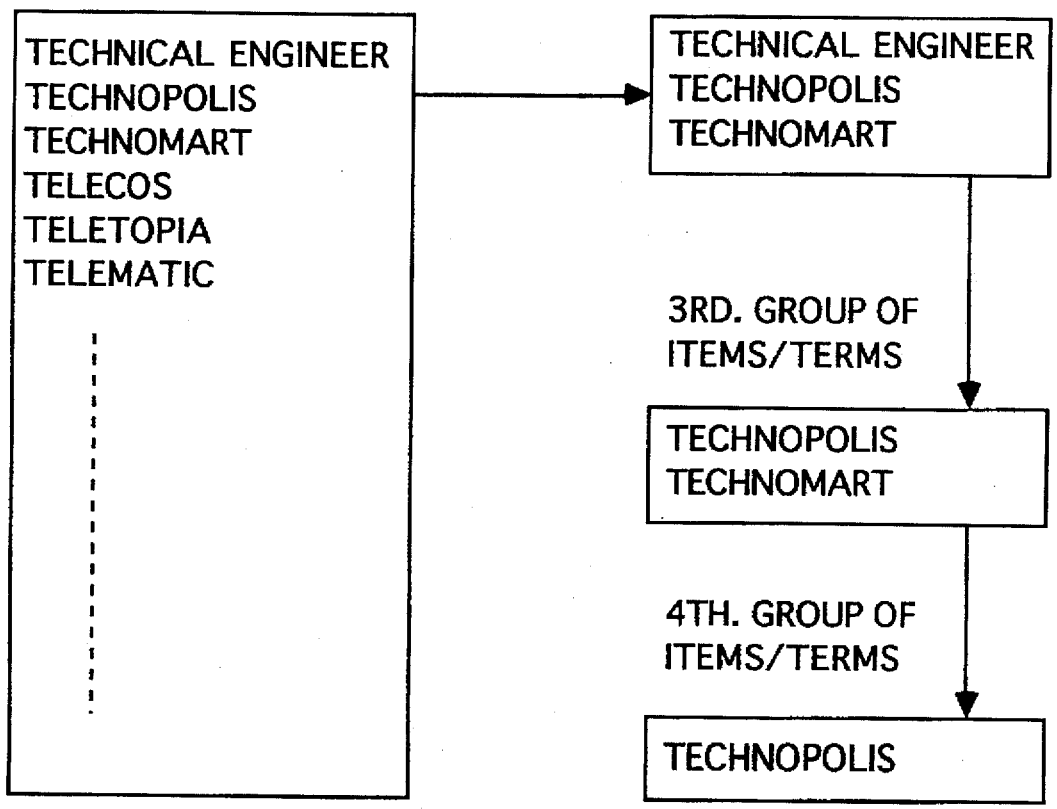

The above-mentioned comparison/reference method (step ST10 in FIG. 2) can be achieved as follows. More specifically, as shown in FIGS. 18A and 18B, terms whose first characters coincide with that of term P1 in paper sheet P are extracted (first classification term group), and then, terms whose second characters coincide with that of term P1 are extracted from the first classification term group (second classification term group). Similarly, terms whose n-th characters coincide with that of term P1 are extracted from the (n−1)-th classification term group, thereby extracting a term whose characters coincide with all the characters of term P1 in paper sheet P from the term section of term explanation memory 9.

Figure 11B:
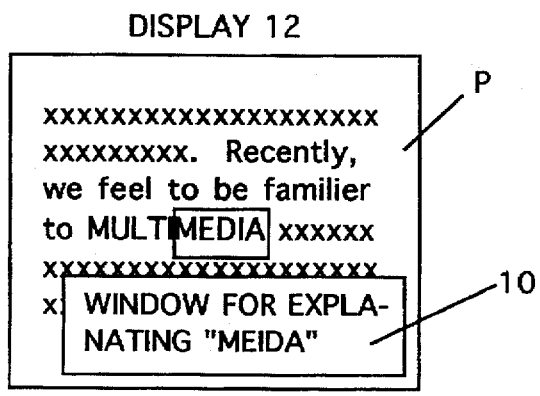
FIG. 11B is a view illustrating a state wherein a term explanation display window (10) is popped up on a computer display (12)

Finally, the term explanation display method (step ST11 in FIG. 2) will be described below. When a term whose characters coincide with all the characters of term P1 extracted from paper sheet P is detected, the corresponding term explanation is extracted from term explanation memory 9, and term explanation display unit 10 is displayed on display 12, as shown in FIG. 11B. Display unit 10 may be embodied as an overlapping window which pops up on the image of paper sheet P. When no coincidences are detected, i.e., when no corresponding term is detected, a message indicating this ("no corresponding term is registered" or the like) is displayed on term explanation display unit 10.

The above-mentioned system aims at obtaining the knowledge about a term pointed by finger A by pointing the upper left portion and the lower right portion of the term with the tip of user's finger A, and displaying the explanation of the pointed term on the display device such as a CRT display, so as to obtain the detailed explanation such as the meaning of term P1 written on paper sheet P without manually looking up a dictionary.

The present invention is the system realized by pointing term P1 in paper sheet P by finger A (a combination of paper sheet P and finger A), but may be realized by various other combinations of media and pointing tools. Note that the function of display unit 10 may be provided to the display unit of a personal computer system equipped with a window system.

As the second embodiment (modification) of the present invention, a system as a combination of a display and a rod (a pencil or pen) or a finger may be proposed. That is, in this system, a display device such as a CRT display is used in place of paper sheet P, term P2 displayed on the CRT display is pointed using, e.g., a rod (a pencil, pen, or the like), and the detailed explanation of term P2 is displayed on the CRT display.

The second embodiment will be described in detail below with reference to the accompanying drawings.

Figure 19:
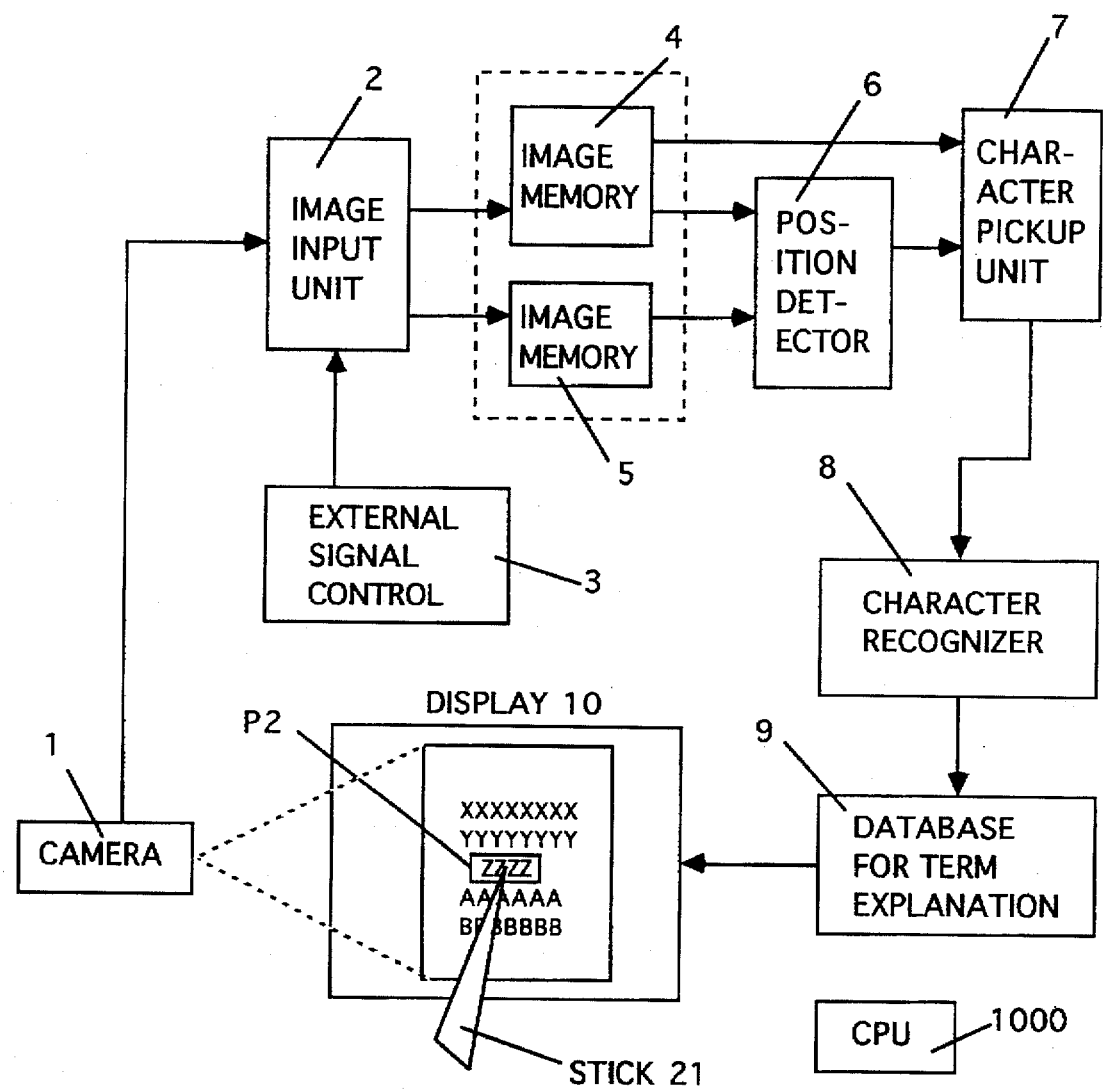
FIG. 19 is a schematic block diagram showing the arrangement of a hypermedia system according to the second embodiment of the present invention.
Figure 20:
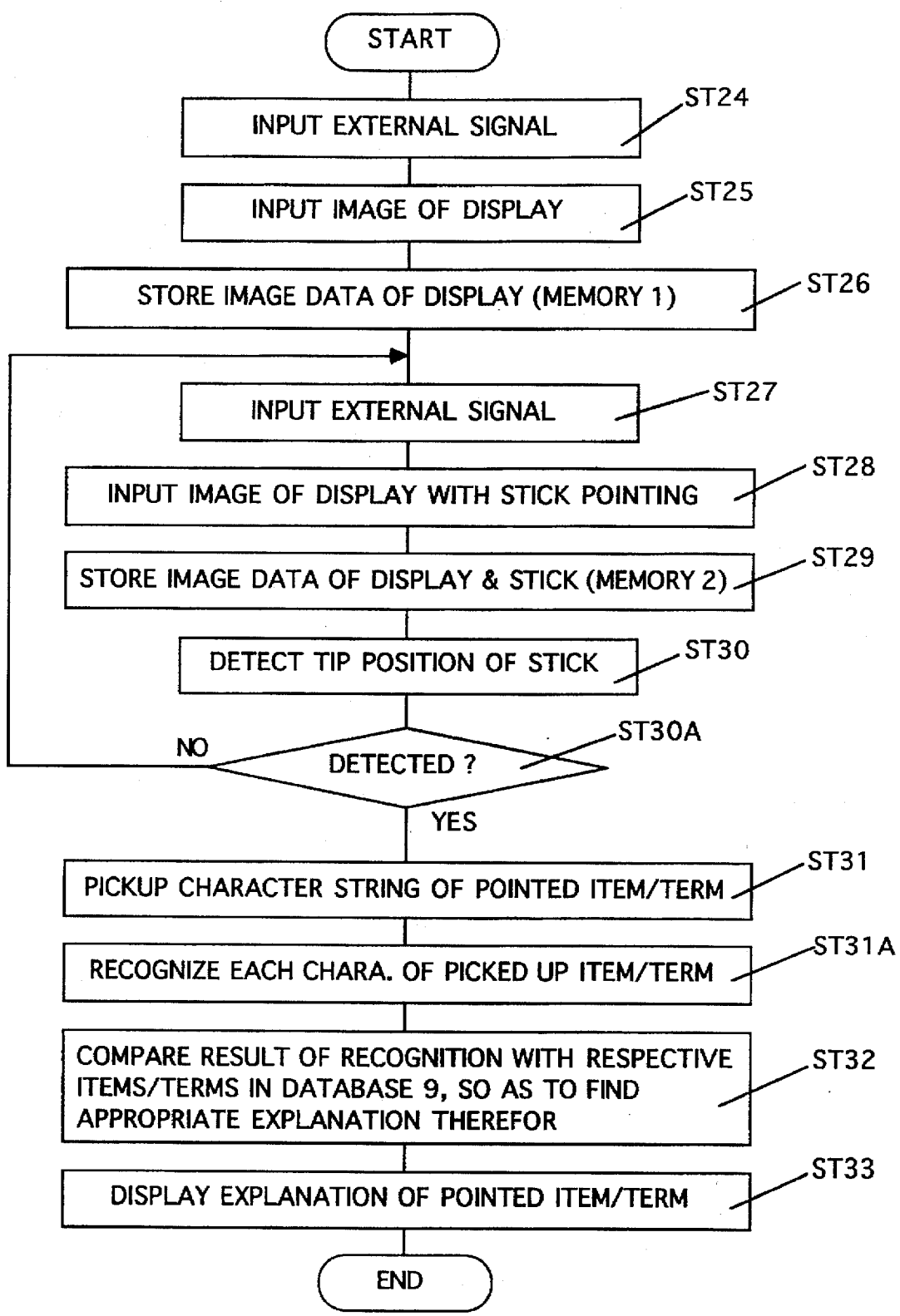
FIG. 20 is a flow chart for explaining the operations from a term pointing manipulation to term explanation display operation in the system shown in FIG. 19.

FIG. 19 is a schematic block diagram showing a hypermedia system according to the second embodiment (modification) of the present invention, and FIG. 20 is a flow chart for explaining the operation of the hypermedia system. Note that the same reference numerals in FIG. 19 denote the same parts as in FIG. 1, and a repetitive description thereof will be omitted.

Referring to FIG. 19, display device 20 such as a CRT display as a medium to be imaged used in place of paper sheet P, and rod, pencil, pen, or the like (pointing means) 21 for pointing a term in a character set displayed on display 20 are arranged.

More specifically, upon input of image data on display 20, a command is supplied to image input unit 2 and image pickup device 1 by controlling external signal controller 3 (step ST24), thereby fetching image data from CRT display 20 (step ST25). External signal controller 3 corresponds to, e.g., a control button (switch), or a speech recognition system, and is manipulated by a user. The fetched image data of display 20 is stored in image data memory 4 in a size of, e.g., M×N pixels (step ST26).

Thereafter, an image in a state wherein a user points a position near the upper right portion of the first character of term P2 on display 20 by, e.g., rod (pencil, pen, or the like) 21 is input from image pickup device 1 to memory 5 via image input unit 2 (step ST28) by controlling external signal controller 3 (step ST27). The input image data is stored in image data memory 5 as pointed image data (step ST29).

Using the image data on display 20 and the pointed image data respectively stored in image data memories 4 and 5, position detector 6 extracts an image of only rod (pencil, pen, or the like) 21 on image data within the range of, e.g., M×N pixels, and detects the tip position of rod (pencil, pen, or the like) 21 from the extracted image (step ST30, NO in step ST30A). Data of the detected rod tip position is stored in an internal memory of position detector 6.

Then, the memory contents of image data memory 5 are cleared, and an image in a state wherein a user points a position near the lower right portion of the last character in term P2 on display 20 by rod (pencil, pen, or the like) 21 is similarly input from image pickup device 1 via image input unit 2 (step ST28) by controlling external signal controller 3 (step ST27). The input image data is stored in image data memory 5 as new pointed image data (step ST29).

Furthermore, position detector 6 similarly extracts an image of only rod (pencil, pen, or the like) 21 on display 20 in the size of, e.g., M×N pixels using the image data on display 20 and the pointed image data respectively stored in image data memories 4 and 5. Position detector 6 detects the pointed end position of rod (pencil, pen, or the like) 21 based on the extracted image (step ST30, NO in step ST30A), and stores the detected position in its another internal memory.

After the end of detection of the rod pointed end position (YES in step ST30A), when the pointed end positions of the rod near the first and last characters in term P2 on display 20 are detected, the characters in term P2 are extracted by character pick up unit 7 on the basis of code information of the detected positions (range) on display 20 (step ST31). The respective characters in term P2 are extracted, so that each of the extracted characters is recognized (step ST31A). Then, the first character in term P2 is compared with the first characters in terms stored in the term section in term explanation memory 9 to extract terms whose first characters coincide with that in term P2. Then, the second character in term P2 is compared with the second characters in the terms of the extracted term group to extract, therefrom, terms whose second characters coincide with that in term P2. In this manner, a term whose characters coincide with all the characters in term P2 is extracted from the term section in term explanation memory 9 (step ST32).

The explanation of the extracted term is displayed within a window at a given position on display 20 (step ST33). When no corresponding term is extracted from term explanation memory 9, a message indicating this ("no corresponding term is registered" or the like) is displayed in the window on display 20.

Figure 21:
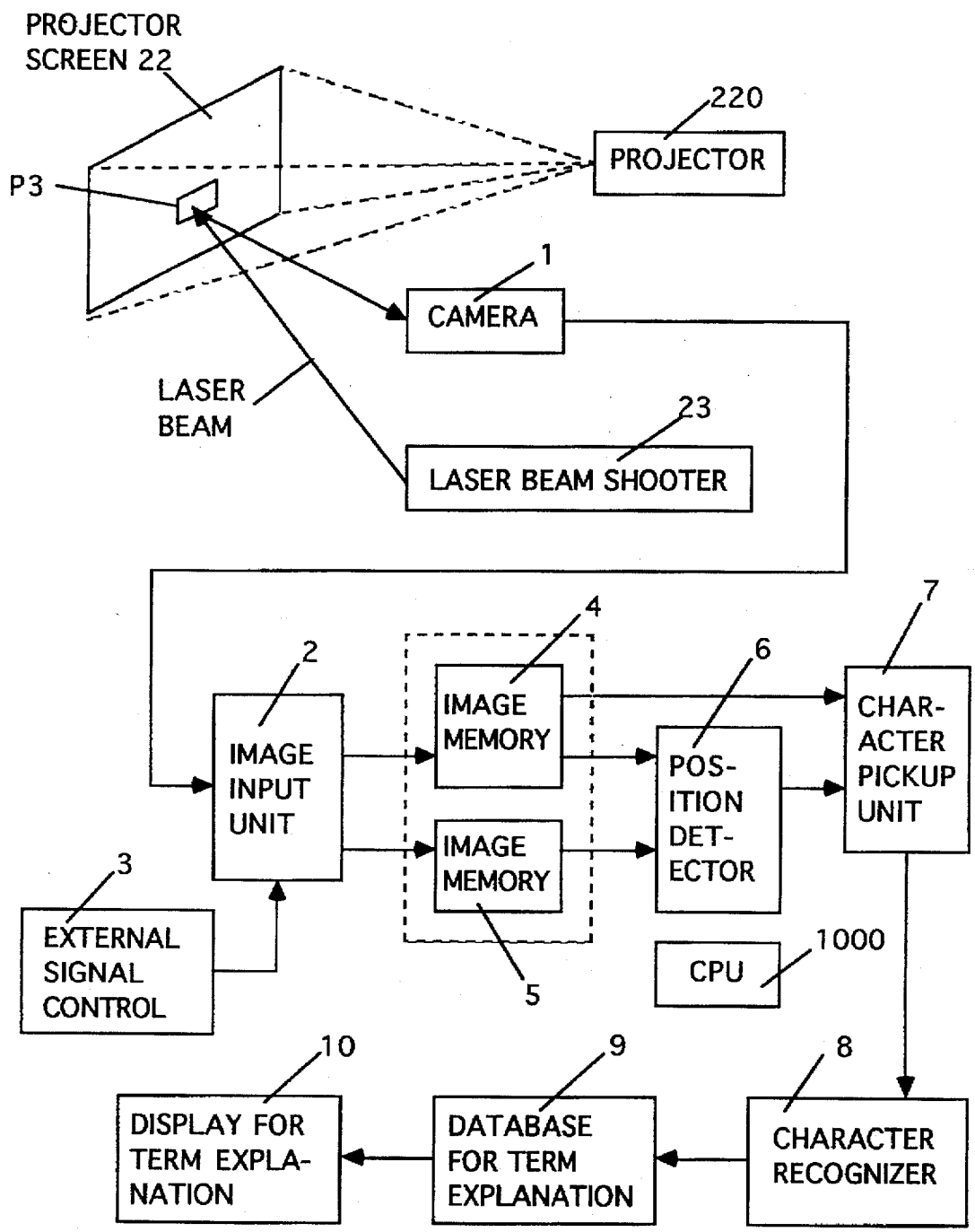
FIG. 21 is a schematic block diagram showing the arrangement of a hypermedia system according to the third embodiment of the present invention.

As the third embodiment (modification) of the present invention, a system as a combination of, e.g., a screen and laser projection is proposed. Referring to FIG. 21, in this system, term P3 displayed on screen 22 in place of paper sheet P is pointed using laser projection or a rod, the image of the pointed state is fetched into the system via image pickup device 1 and image input unit 2, and the detailed explanation of term P3 is displayed on display device 10.

The third embodiment will be described in detail below with reference to the accompanying drawings.

Figure 22:
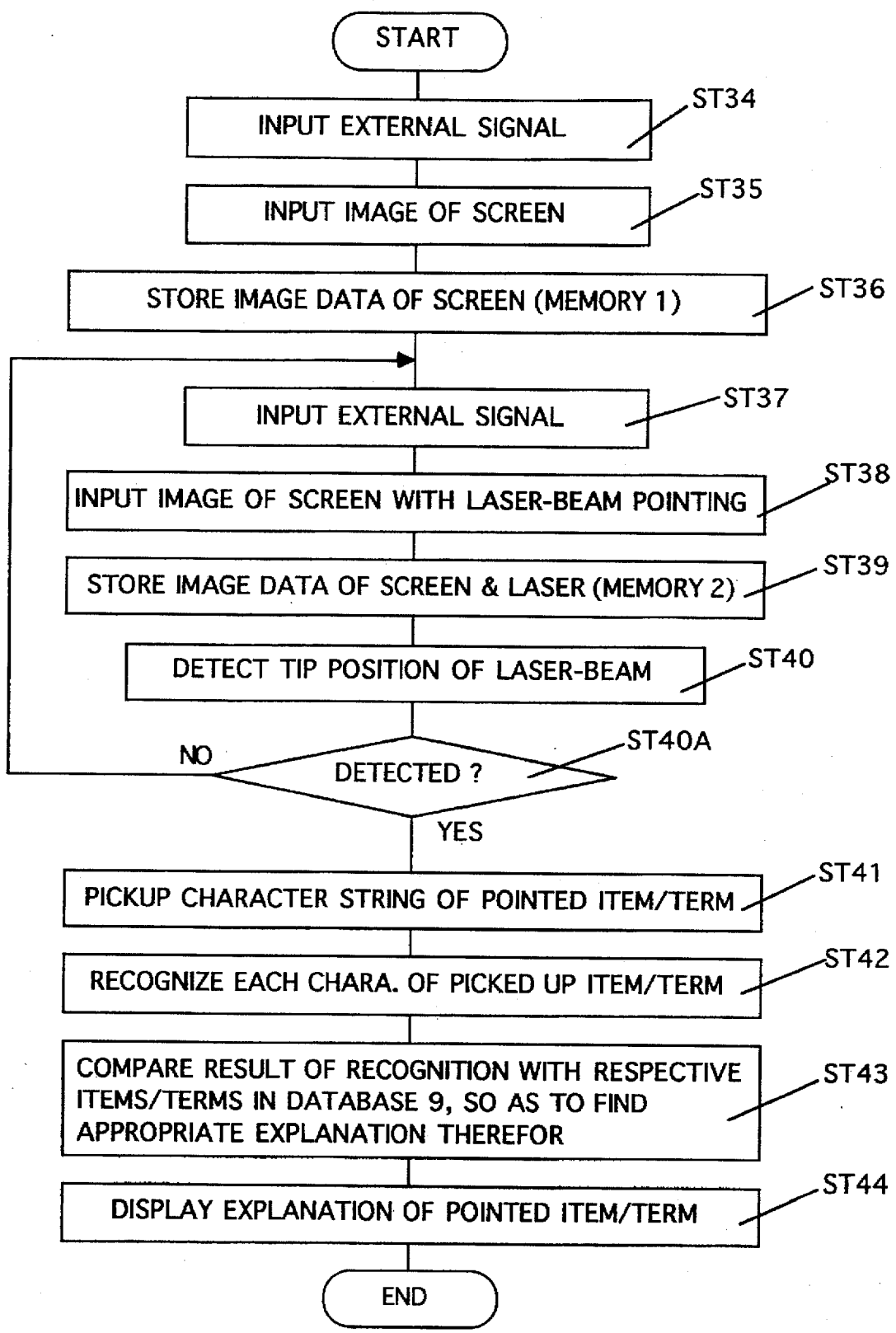
FIG. 22 is a flow chart for explaining the operations from a term pointing manipulation to term explanation display operation in the system shown in FIG. 21.

FIG. 21 is a schematic block diagram showing a hypermedia system according to the third embodiment of the present invention, and FIG. 22 is a flow chart for explaining the operation of the hypermedia system. Note that the same reference numerals in FIG. 21 denote the same parts as in FIG. 1, and a repetitive description thereof will be omitted.

Referring to FIG. 21, screen 22 as a medium to be imaged used in place of paper sheet P, and laser projector 23 for generating a laser beam used for pointing a term in characters displayed on screen 22 are arranged.

More specifically, upon input of image data on screen 22, a command is supplied to image input unit 2 and image pickup device 1 by controlling external signal controller 3 (step ST34), thereby fetching image data screen 22 (step ST35). External signal controller 3 corresponds to, e.g., a control button (switch), or a speech recognition system, and is manipulated by a user. The fetched image data of screen 22 is stored in image data memory 4 in the size of, e.g., M×N pixels (step ST36).

Thereafter, an image in a state wherein a user or operator projects a laser beam onto a position near the upper right portion of the first character of term P3 on screen 22 is input from image pickup device 1 via image input unit 2 (step ST38) by similarly controlling external signal controller 3 (step ST37). The input image data is stored in image data memory 5 as pointed image data (step ST39). Note that the camera angle and/or iris (exposure amount) are/is adjusted, so that the optical path of the laser beam is always displayed on an image. In this embodiment, the binarization processing based on equation (1) above in the first embodiment is modified to be executed based on equation (2) below:

$$D_{i,j}=|G_{i,j}-F_{i,j}|\geq K \qquad (2)$$

Note that the equation need not be modified when a term is pointed by a rod. Using the image data on screen 22 and the laser projected (pointed) image data respectively stored in image data memories 4 and 5, position detector 6 extracts only an optical path image of the laser beam from the image data in a range of, e.g., M×N pixels, and detects the position of the impinging end, on the screen, of the laser beam from the extracted image (step ST40, NO in step ST40A). The detected laser beam impinging end position data is stored in the internal memory of position detector 6.

The memory contents of image data memory 5 are cleared, and an image in a state wherein a user projects the laser beam onto a position near the lower right portion of the last character in term P3 on screen 22 is input via image pickup device 1 and image input unit 2 by similarly controlling external signal controller 3. The input image data is stored in image data memory 5 as new pointed image data (step ST39).

Furthermore, using the image data on screen 22 and the laser projected (pointed) image data respectively stored in image data memories 4 and 5 (stored data 1 and 2), position detector 6 similarly extracts only an image of the laser beam on image data within the range of, e.g., M×N pixels. Position detector 6 detects the position of the impinging end, on the screen, of the laser beam from the extracted image (step ST40, NO in step ST40A), and stores the detected position data in its another internal memory.

After the end of detection of the laser beam impinging end position (YES in step ST40A), when the impinging end positions of the laser beam near the first and last characters in term P3 on screen 22 are detected, image data near term P3 on screen 22 is extracted based on the two detected positions from the image data on screen 22, which is stored in image data memory 4. Character pick up unit 7 extracts target term P3 from the extracted image (step ST41), and extracts the respective characters in term P3. Then, character recognition unit 8 recognizes each of the extracted characters using the multiple similarity method (step ST42).

The first character in term P3 is compared with the first characters in terms stored in the term section in term explanation memory 9 to extract terms whose first characters coincide with that in term P3. Then, the second character in term P3 is compared with the second characters in the terms of the extracted term group to extract, therefrom, terms whose second characters coincide with that in term P3 (step ST43). In this manner, a term whose characters coincide with all the characters in term P3 is extracted from the term section in term explanation memory 9.

The explanation of the extracted term is displayed on term explanation display unit 10 (step ST44). Term explanation display unit 10 displays the detailed explanation of a term which requires an explanation, and comprises a display device such as a CRT display. When no term is extracted from term explanation memory 9, a message indicating this ("no corresponding term is registered" or the like) is displayed on term explanation display unit 10.

Note that term P3 projected on screen 22 may be those used in every field, and terms and their explanations stored in term explanation memory 9 may also be those used in every field.

Image data on screen 22 is not limited to a density image but may be a color image Furthermore, the image data on screen 22 is stored first in image data memory 4, thereafter, image data in a state wherein the laser beam is projected onto a position near the upper left portion of the first character in term P3 on screen 22, or image data in a state wherein the laser beam is projected onto a position near the lower right portion of the last character in term P3 on screen 22 is stored in image data memory 5, and the image data of term P3 is extracted from the image data in image data memory 4. In this manner, since two image data are stored in image data memories 4 and 5, term P3 can be extracted even when term P3 on screen 22 is concealed by the laser beam upon pointing of term P3 on screen 22 by laser projection.

In this case, term P3 may be pointed by several different methods. For example, a laser beam is projected to draw an underline below term P3 or is projected to circle term P3. When an underline is drawn, term P3 is specified based on the start and end points of the underline. On the other hand, when term P3 is circled, term P3 is specified based on the upper left corner position and the lower right corner position of the circling range (cf. FIG. 12).

As the fourth embodiment (modification) of the present invention, a system as a combination of a signboard and a pointing rod is proposed. In this system, term P4 printed on, e.g., signboard 24 in place of term P1 in paper sheet P is pointed using a pointing rod via image pickup device 1 and image input unit 2, and the detailed explanation of term P4 is displayed on display device 10.

The fourth embodiment will be described in detail below with reference to the accompanying drawings.

Figure 23:
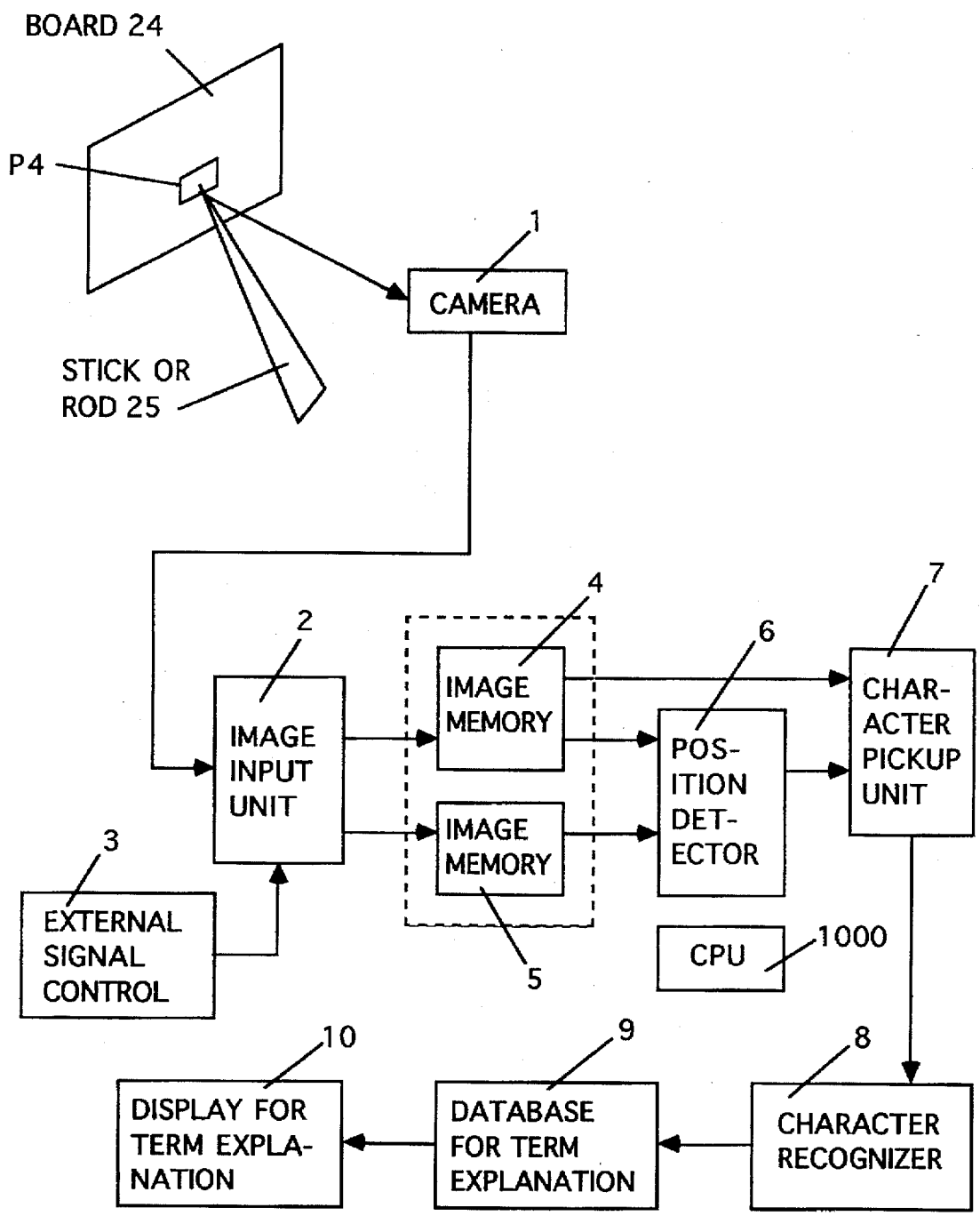
FIG. 23 is a schematic block diagram showing the arrangement of a hypermedia system according to the fourth embodiment of the present invention.
Figure 24:
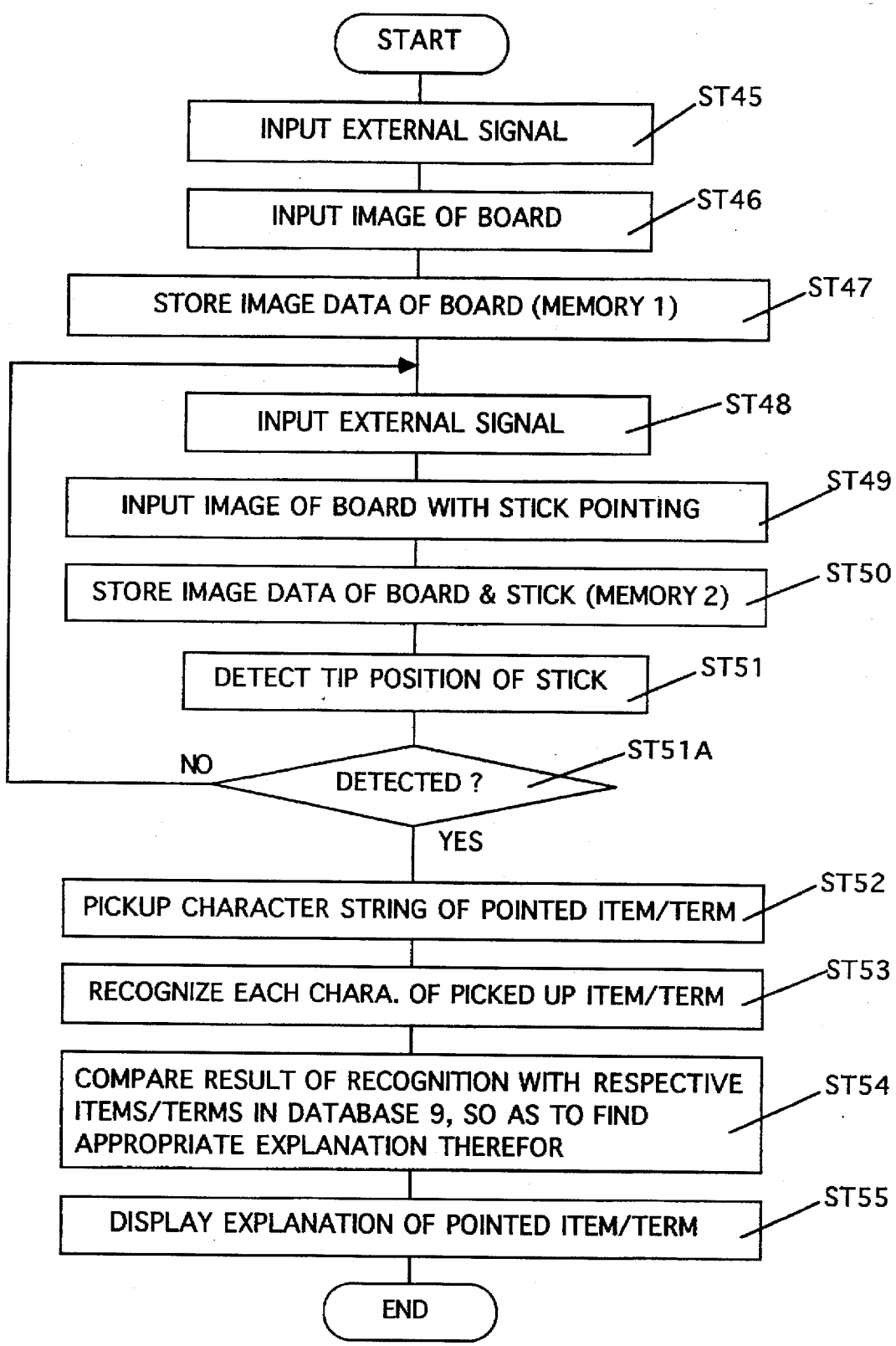
FIG. 24 is a flow chart for explaining the operations from a term pointing manipulation to term explanation display operation in the system shown in FIG. 23.

FIG. 23 is a schematic block diagram showing a hypermedia system according to the fourth embodiment of the present invention, and FIG. 24 is a flow chart for explaining the operation of the hypermedia system. Note that the same reference numerals in FIG. 23 denote the same parts as in FIG. 1, and a repetitive description thereof will be omitted.

Referring to FIG. 23, signboard 24 as a medium to be imaged used in place of paper sheet P, and pointing rod (pointing means) 25 used for pointing a term in characters printed on signboard 24 are arranged.

More specifically, upon input of image data on signboard 24, a command is supplied to image input unit 2 and image pickup device 1 by controlling external signal controller 3 (step ST45), thereby fetching image data from signboard 24 (step ST46). External signal controller 3 corresponds to, e.g., a control button (switch), or a speech recognition system, and is manipulated by a user. The fetched image data of signboard 24 fetched by image input unit 2 is stored in image data memory 4 in the size of, e.g., M×N pixels (step ST47).

Thereafter, by similarly controlling external signal controller 3 (step ST48), an image in a state wherein a user points a position near the upper left portion of the first character in term P4 on signboard 24 by pointing rod 25 is input from image pickup device 1 via image input unit 2 (step ST49), and the input image data is stored in image data memory 5 as pointed image data (step ST50).

Using the image data of signboard 24 and the pointed image data respectively stored in image data memories 4 and 5, position detector 6 extracts an image of only pointing rod 25 on the image data in the size of, e.g., M×N pixels. Position detector 6 detects the pointed end position of pointing rod 25 from the extracted image (step ST51, NO in step ST51A), and stores the detected position data in its internal memory. In order to facilitate extraction of the image of only pointing rod 25, rod 25 may comprise a chromium-plated, glossy rod to increase contrast of the image of rod 25 relative to the surrounding portion.

Then, the memory contents of image data memory 5 are cleared, and by similarly controlling external signal controller 3, an image in a state wherein a user points a position near the lower right portion of the last character in term P4 on signboard 24 by pointing rod 25 is input via image pickup device 1 and image input unit 2 (step ST49). The input image data is stored in image data memory 5 as new pointed image data (step ST50).

Furthermore, using the image data of signboard 24 and the pointed image data respectively stored in image data memories 4 and 5, position detector 6 similarly extracts an image of only pointing rod 25 on the image data in the size of, e.g., M×N pixels, detects the pointed end position of pointing rod 25 from the extracted image (step ST51), and stores the detected position data in its another internal memory.

When the pointed end positions of the pointing rod 25 near the first and last characters in term P4 on signboard 24 are detected (YES in step ST51A), image data near term P4 on signboard 24 is extracted from the image data of signboard 24 stored in image memory 4 on the basis of the detected positions.

Then, character pick up unit 7 extracts target term P4 from the extracted image (step ST52), and extracts the respective characters in term P4. Thereafter, character recognition unit 8 recognizes each of the extracted characters using multiple similarity method (step ST53).

The first character in term P4 is compared with the first characters in terms stored in the term section in term explanation memory 9 to extract terms whose first characters coincide with that in term P4. Then, the second character in term P4 is compared with the second characters in the terms of the extracted term group to extract, therefrom, terms whose second characters coincide with that in term P4. In this manner, a term whose characters coincide with all the characters in term P4 is extracted from the term section in term explanation memory 9 (step ST54).

The explanation of the extracted term is displayed on term explanation display unit 10 (step ST55). Term explanation display unit 10 displays the detailed explanation of a term which requires an explanation, and may comprise a computer monitor such as a bit-map display. When no term is extracted from term explanation memory 9, a message indicating this ("no corresponding term is registered" or the like) is displayed on term explanation display unit 10.

Note that term P4 printed on signboard 24 may be those used in every field, and terms and their explanations stored in term explanation memory 9 may also be those used in every field.

Image data on signboard 24 is not limited to a density image but may be a color image Furthermore, image data of signboard 24 is stored first in image data memory 4, thereafter, image data in a state wherein a position near the upper left portion of the first character in term P4 on signboard 24 is pointed by pointing rod 25 or image data in a state wherein a position near the lower right portion of the last character in term P4 on signboard 24 is pointed by pointing rod 25 is stored in image data memory 5, and image data of term P4 is extracted from the image data stored in image data memory 4. In this manner, since the two image data are stored in image data memories 4 and 5, even when term P4 on signboard 24 is concealed by the pointing rod upon pointing of term P4 on signboard 24 by pointing rod 25, the image of term P4 can be fetched.

As the pointing method of term P4, the already-mentioned methods can be used. More specifically, the positions near the first and last characters in term P4 are pointed, term P4 is pointed to draw an underline therebelow, term P4 is pointed to be circled, and so on.

Figure 25:
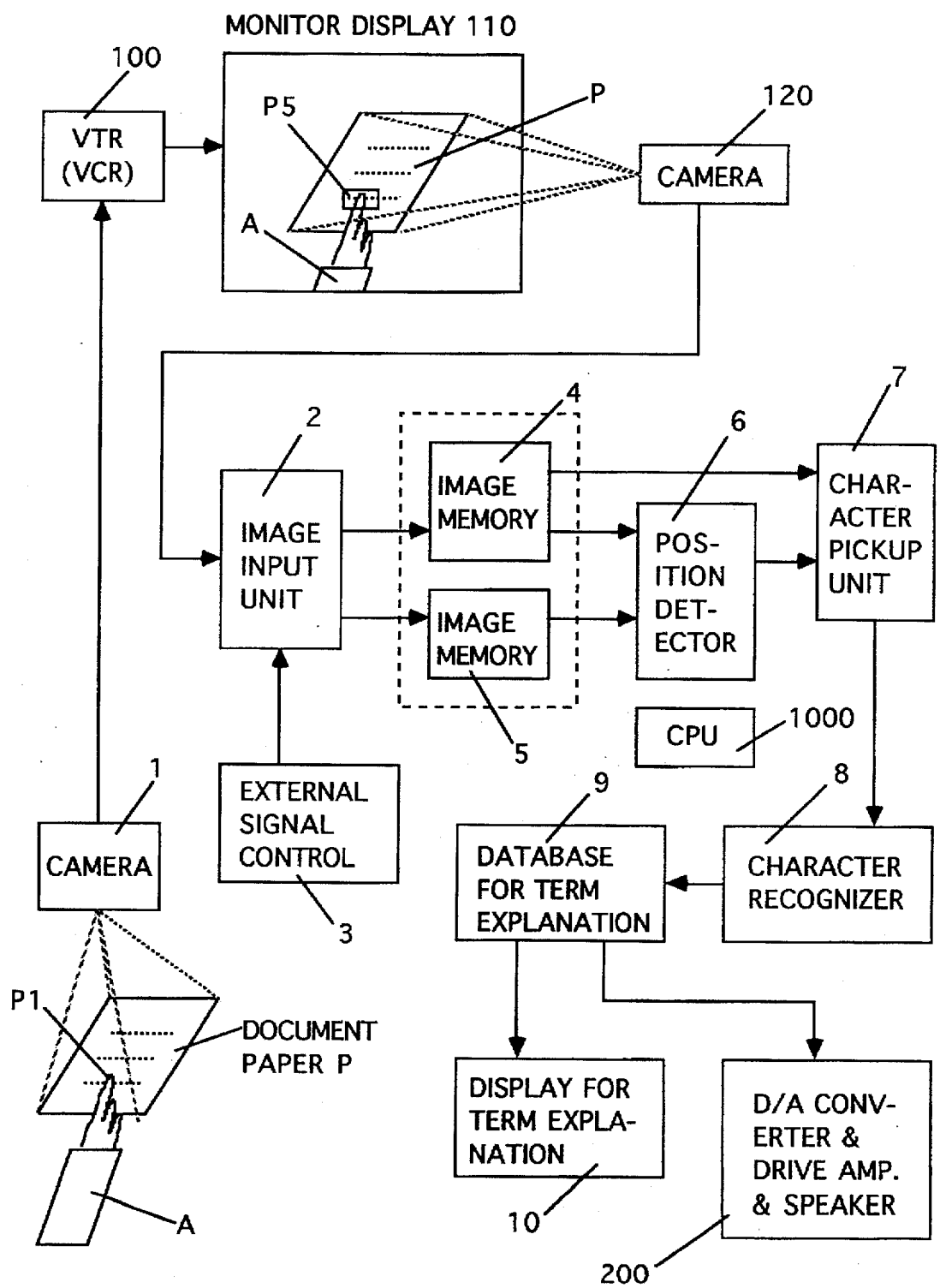
FIG. 25 is a block diagram showing the fifth embodiment of the present invention.

FIG. 25 shows the fifth embodiment. When no display device 10 is available near a user or when a user need not immediately know the detailed explanation of term P4 described on signboard 24, the user records an image of signboard 24 using TV camera 1 and VTR 100. Thereafter, the recorded image is played back by VTR 100, and the playback picture is re-displayed on a monitor display. As in the second embodiment shown in FIG. 19, term P5 displayed on the monitor is pointed by a rod or finger, and the detailed explanation of term P5 is displayed on display 10.

If camera 1 comprises a digital electronic still camera, VTR 100 may be replaced with a personal computer in which an image processing software program runs.

As described above, the detailed explanation of each term in every field printed on every type of paper sheet such as newspapers, magazines, teaching materials, and the like, and a term which a user does not know can be easily displayed on a display device such as a CRT display by pointing the term with a finger without manually looking up a dictionary.

If a term pointed by a user corresponds to the title or composer of a music piece, sampling data may be read out from memory 9, and musical tones may be output from speaker 200. On the other hand, if the pointed term corresponds to the name of a cinema director, the moving picture of his or her masterpiece may be output on display unit 10.

Even a heavily handicapped person who cannot freely move his or her hands can know the detailed explanation of an unknown term or a term to be known in detail by slightly moving his or her finger (pointing the term with his or her finger).

As described above, according to the present invention, a hypermedia system which allows an easy, simple pointing input manipulation, and can easily display the detailed explanation of a term without manually looking up a dictionary can be provided.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An information service system comprising:

a database which stores data for explaining a plurality of items or terms;

means for picking up image information of a visual medium on which one or more items or terms are displayed;

first obtaining means for obtaining first image information of the visual medium from said picking up means;

second obtaining means for obtaining second image information representing a visual pointing object and a specific item or term on the visual medium from said picking up means, wherein the specific item or term is pointed by the visual pointing object;

tip position detecting means for detecting a tip position of the visual pointing object from the first and second image information obtained by said first and second obtaining means;

word recognizing means for recognizing a keyword included in image data of the specific item or term from the first image information obtained by said first obtaining means, wherein the recognized keyword is located at a particular position of the visual medium and the particular position corresponds to the tip position of the visual pointing object detected by said detecting means;

means for searching said database in accordance with the keyword corresponding to the image data of the specific item or term recognized by said word recognizing means, so as to find explanation information for the specific item or term; and means for outputting the explanation information found by said searching means.

2. The system of claim 1, wherein said searching means includes:

character recognizing means for recognizing one or more characters constituting the specific item or term picked up by said word recognizing means, so as to provide a character code corresponding to the recognized characters; and means for comparing the character code provided by said character recognizing means with the data stored in said database, so as to provide the explanation information for the specific item or term.

3. The system of claim 1, wherein said outputting means includes means for displaying not only an image of the visual medium but also an image of the explanation information found by said searching means.

4. The system of claim 1, wherein said outputting means includes means for providing a voice service relating to the explanation information found by said searching means.

5. The system of claim 1, wherein the specific item or term on the visual medium includes any of a word, picture, color, or pattern.

6. The system of claim 1, wherein an image of the visual pointing object includes a finger image of a system user who needs explanation of the specific item or term pointed by his or her finger.

7. The system of claim 1, wherein an image of the visual pointing object includes a rod whose tip points the specific item or term.

8. The system of claim 1, wherein an image of the visual pointing object includes a light beam whose tip points the specific item or term.

9. The system of claim 1, wherein said tip position detecting means includes:

difference detecting means for detecting a difference between the first image information obtained by said first obtaining means and the second image information obtained by said second obtaining means, so as to extract an image of the visual pointing object;

start position detecting means for detecting a start position of the specific item or term which start position is pointed by the visual pointing object; and end position detecting means for detecting an end position of the specific item or term which end position is pointed by the visual pointing object, and wherein said searching means includes:

means for extracting an item or term within a specific area on the visual medium which specific area is defined by the start position detected by said start position detecting means and the end position detected by said end position detecting means.

10. The system of claim 1, further comprising:

means for recording an image of the visual medium;

means for reproducing the image of the visual medium recorded by said recording means; and means for capturing an image reproduced by said reproducing means so as to supply the captured image as the first image information to said first obtaining means.

11. An information service method using a database which stores data for explaining a plurality of items or terms, said information service method comprising the steps of:

picking up image information of a visual medium on which one or more items or terms exist;

obtaining first image information of the visual medium from said image information;

obtaining second image information representing a visual pointing object and a specific item or term on the visual medium from said image information, wherein the specific item or term is pointed by the visual pointing object;

detecting a tip position of the visual pointing object from the first and second image information;

recognizing a keyword included in image data of the specific item or term from the first image information, wherein the recognized keyword is located at a particular position of the visual medium and the particular position corresponds to the tip position of the visual pointing object;

searching said database in accordance with the keyword corresponding to the image data of the specific item or term recognized by said recognizing step, so as to find explanation information for the specific item or term; and outputting the explanation information.

12. The method of claim 11, wherein said searching step includes:

recognizing one or more characters constituting the specific item or term so as to provide a character code corresponding to the recognized characters; and comparing the character code with the data stored in said database so as to provide the explanation information for the specific item or term.

13. The method of claim 11, wherein said outputting step includes:

displaying not only an image of the visual medium but also an image of the explanation information.

14. The method of claim 11, wherein said outputting step includes:

providing a voice service relating to the explanation information.

15. The method of claim 11, wherein said detecting step includes:

detecting a difference between the first image information and the second image information so as to extract an image of the visual pointing object;

detecting a start position of the specific item or term which start position is pointed by the visual pointing object; and detecting an end position of the specific item or term which end position is pointed by the visual pointing object, and wherein said recognizing step includes:

extracting an item or term within a specific area on the visual medium which specific area is defined by the start position and the end position.

16. The method of claim 11, further comprising the steps of:

recording an image of the visual medium;

reproducing the recorded image of the visual medium; and capturing the reproduced recorded image so as to supply the captured image as the first image information to said first image obtaining step.

17. An apparatus for assisting a knowledge of a user in response to a pointing operation of the user, said apparatus comprising:

means for picking up an image of a medium;

means for pointing a prescribed position on the medium;

first memory means for storing a first image of the medium picked up by said picking up means;

second memory means for storing a second image of the medium picked up by said picking up means, said second image including an image of said pointing means;

means for detecting the prescribed position pointed by said pointing means in accordance with the first image stored in said first memory means and the second image stored in said second memory means;

means for extracting an item or term placed at the prescribed position of said medium; and means for recognizing respective characters constituting the item or term extracted by said extracting means so as to provide a result of recognition.

18. The apparatus of claim 17, further comprising:

third memory means for storing a plurality of explanation texts corresponding to items or terms any one of which can be pointed by the user; and means for reading out a specific text from said third memory means in accordance with the result of recognition provided by said recognizing means.

* * * * *